United States Patent [19]
Sekiya et al.

[11] Patent Number: 6,134,692
[45] Date of Patent: Oct. 17, 2000

[54] INFORMATION IDENTIFICATION SYSTEM FOR IDENTIFYING RESPONSE UNITS BY A CONTROL UNIT, AND THE CONTROL UNIT AND THE RESPONSE UNITS FOR THE INFORMATION IDENTIFICATION SYSTEM

[75] Inventors: Kunihiko Sekiya, Yokohama; Katsumi Nitta; Hirobumi Karasawa, both of Tokyo; Michiaki Okano, Yokohama; Katsuhiko Kuma, Yokohama; Kazunori Iwasaki, Yokohama; Kensuke Uehara, Tokyo; Satoru Hashimoto, Kamakura, all of Japan

[73] Assignee: Kabushiki Kaisha Toshiba, Kawasaki, Japan

[21] Appl. No.: 09/044,925

[22] Filed: Mar. 20, 1998

[30] Foreign Application Priority Data

Mar. 21, 1997 [JP] Japan .................................. 9-068706
Mar. 16, 1998 [JP] Japan ................................. 10-065757

[51] Int. Cl.$^7$ ........................................................ H04L 1/16
[52] U.S. Cl. ................ 714/749; 340/825.14; 340/825.54
[58] Field of Search .................................. 714/748, 749; 340/825.03, 825.04, 825.06, 825.07, 825.08, 825.21, 825.44, 825.52, 825.53, 825.54; 370/346, 347, 348, 349

[56] References Cited

U.S. PATENT DOCUMENTS

| | | | |
|---|---|---|---|
| 5,053,883 | 10/1991 | Johnson | 358/349 |
| 5,124,697 | 6/1992 | Moore | 340/825.44 |
| 5,150,114 | 9/1992 | Johansson | 340/825.54 |
| 5,266,925 | 11/1993 | Vercellotti et al. | 340/572 |
| 5,365,551 | 11/1994 | Snodgrass et al. | 375/1 |
| 5,425,032 | 6/1995 | Shloss et al. | 370/95.2 |
| 5,541,928 | 7/1996 | Kobayashi et al. | 370/95.1 |
| 5,621,735 | 4/1997 | Rochester, Jr. et al. | 370/346 |
| 5,952,922 | 9/1999 | Shober | 340/572.4 |

*Primary Examiner*—Stephen M. Baker
*Attorney, Agent, or Firm*—Oblon, Spivak, McClelland, Maier & Neustadt, P.C.

[57] ABSTRACT

A control unit transmits address area designation information designating an arbitrary bit position in ID data. At least a response unit transmits a response signal with an error detection code attached to predetermined information in the unique information held in itself by means of a time slot determined by the address area designation information and the ID data of the particular response unit. The control unit checks for the presence or absence of an error of the information in each time that has arrived, fetches only the response signal free of error, and transmits the error presence-absence information indicating the inspection result. Further, in the case where there exists a time slot having an error, the control unit transmits new address area designation information. In the case where an error exists in the time sot used previously by the response unit, the response unit retransmits the response signal in the time slot determined from the new address area designation information and the ID data of the response unit.

26 Claims, 25 Drawing Sheets

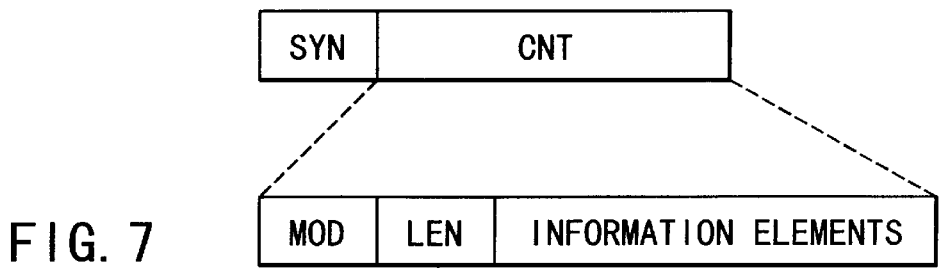
FIG. 7
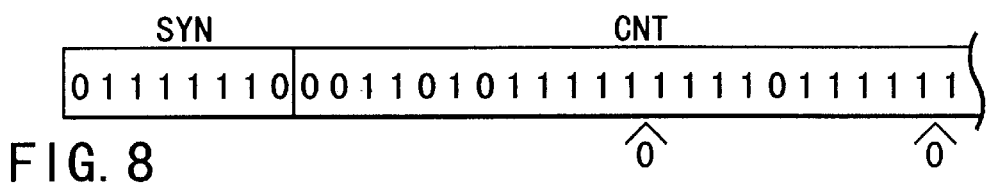
FIG. 8
FIG. 9
| BIT ASSIGNMENT | CONTENTS |
|---|---|
| 0 0 0 0 0 0 0 1 | ENTRY 1 |
| 0 0 0 0 0 0 1 0 | ENTRY 2 |
| ⑤ | ⑤ |
| 0 0 0 0 1 1 1 1 | ENTRY 15 |
| 0 0 0 1 0 0 0 1 | REENTRY 1 |
| 0 0 0 1 0 0 1 0 | REENTRY 2 |
| ⑤ | ⑤ |
| 0 0 0 1 1 1 1 1 | REENTRY 15 |
| 0 0 1 0 0 0 0 0 | POLING |
FIG. 10

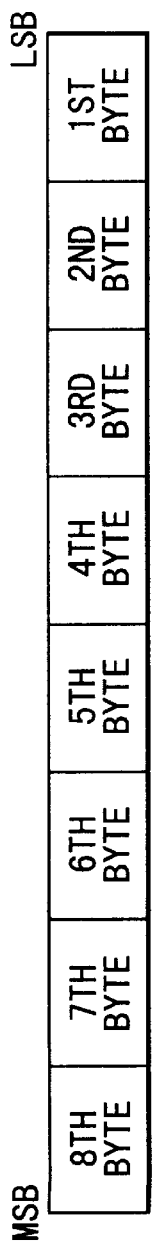

| | 8TH BYTE | 7TH BYTE | 6TH BYTE | 5TH BYTE | 4TH BYTE | 3RD BYTE | 2ND BYTE | 1ST BYTE |
|---|---|---|---|---|---|---|---|---|
| RESPONSE UNIT a | 1A | 2B | 3C | 4D | 56 | 78 | 9A | BC |
| RESPONSE UNIT b | 1A | 2B | 3C | 4D | 67 | 89 | AB | CD |
| RESPONSE UNIT c | 1A | 2B | 3C | 4D | 78 | 9A | BC | DE |
| RESPONSE UNIT l | AB | CD | EF | 12 | 34 | 00 | 00 | 00 |
| RESPONSE UNIT m | AB | CD | EF | 12 | 34 | 11 | 11 | 11 |
| RESPONSE UNIT n | AB | CD | EF | 12 | 34 | 22 | 22 | 22 |

Response units a, b, c: FIRST GROUP
Response units l, m, n: SECOND GROUP

FIG. 34

| TYPE CODE | | CRC | | CRC | | CRC | | CRC |
|---|---|---|---|---|---|---|---|---|
| 11111000 | ABCDEF1234 | | 000000 | | 111111 | | 222222 | |

| RESPONSE UNIT a | 1 0 0 1 0 0 1 0 |
| RESPONSE UNIT b | 1 0 0 1 0 1 1 0 |
| RESPONSE UNIT c | 1 0 0 1 0 1 1 1 |
| RESPONSE UNIT d | 1 1 1 0 0 1 1 1 |

FIG. 46A

| TYPE CODE | LNG | 0 | 1 | 0 | P |

FIG. 46B

| TYPE CODE | LNG | 1 | 1 | 0 | P |

FIG. 46C

| TYPE CODE | LNG | 1 | 0 | 1 | 1 | 1 | P |

FIG. 46D

| TYPE CODE | LNG | 0 | 0 | 1 | 1 | 1 | P |

LNG:LENGTH
P:PARITY BIT

, 134,692

INFORMATION IDENTIFICATION SYSTEM FOR IDENTIFYING RESPONSE UNITS BY A CONTROL UNIT, AND THE CONTROL UNIT AND THE RESPONSE UNITS FOR THE INFORMATION IDENTIFICATION SYSTEM

BACKGROUND OF THE INVENTION

The present invention relates to an information identification (ID) system capable of managing a plurality of commodities each having mounted thereon a response unit, by reading the unique information held in the response unit, and the control unit and response units for realizing the system.

A technique for reading the ID data of a radio tag attached to a commodity or the like is known as disclosed in U.S. Pat. No. 5,537,105, for example. In this technique, each radio tag transmits a response signal including ID data to an inquiry signal from a questioner. In the process, each radio tag generates a predetermined random number and delays the timing of transmitting a response signal based on the value of the random number. As a result, the collision probability of the signals sent out by a plurality of radio tags is reduced.

In spite of the fact that the transmission timing of each radio tag is differentiated based on random numbers as described above, the collision probability increases if the bit length of the random numbers is small. In fact, an indefinite factor exists by which collision is repeated endlessly. An increased bit length, on the other hand, though capable of suppressing the collision probability, increases the waiting time, resulting in an increased overall read time. Further, in the case where the number of objects to be read is small, the waiting time occupies a considerable proportion of the whole time during which only a small number of signals are transmitted, thereby leading to a very low efficiency.

BRIEF SUMMARY OF THE INVENTION

The present invention has been developed in view of the above-mentioned situation, and the object thereof is to provide an information identification system capable of reading the unique information held in a plurality of response units efficiently by a control unit within a short length of time, and a control unit and at least a response unit for realizing such an information identification system.

The above-mentioned object is realized by an information identification system described below.

According to one aspect of the present invention, there is provided an information identification system comprising a plurality of response units each having predetermined unique information including unique identification data having binary data of a plurality of bits, and a control unit for reading predetermined read data included in the unique information transmitted from the response units, the system further comprising:

bit position designation means arranged in the control unit for producing predetermined bit position information designating an arbitrary bit position in the identification data and transmitting the bit position information to a predetermined downlink;

response information transmission means arranged on each of the response units for producing predetermined response information with a predetermined error detection code attached to the read information held in the response units in response to the arrival of the bit position information transmitted by the bit position designation means, and transmitting the predetermined response information to a predetermined uplink in a time slot corresponding to the state of the bit string of the bit position indicated in the arriving bit position information held in the response unit;

error inspection means arranged in the control unit for checking for the presence or absence of an error of the response information in each time slot arriving through the uplink, based on the error detection code included in each response information;

response information fetching means arranged in the control unit for fetching only the response information arriving in the time slots judged to be free of an error by the error inspection means;

inspection result notification means arranged in the control unit for producing the inspection result information indicating the result of the inspection by the error inspection means and transmitting the error checking result information to the downlink;

repetitive requesting means arranged in the control unit for causing the bit position designation means to transmit the bit position information designating a bit position different from the previously-designated bit position in response to the detection by the error inspection means of at least a time slot having an error; and repetitive response means arranged in each of the response units for causing the response information transmission means to transmit the response information to the uplink channel in a time slot corresponding to the state of the bit string at the bit position indicated by the bit position information transmitted newly by the bit position designating means in the identification data held in the response unit, in response to the judgement that an error exists in a time slot used for transmission of the response information by the response information transmission means of the response unit in the inspection result information transmitted by the inspection result notification means.

The object as described above can be realized by an information identification system described below.

According to another aspect of the invention, there is provided an information identification system comprising a plurality of response units each having predetermined unique information including at least unique identification data having binary data of a plurality of bits and a control unit for reading predetermined read data including at least a part of the identification data included in the unique information transmitted from the response unit, the system further comprising:

bit position designation means arranged in the control unit for producing predetermined bit position information for designating an arbitrary bit position in the identification data and transmitting the bit position information to a predetermined downlink;

response information transmission means arranged in each of the response units for producing predetermined response information with a predetermined error detection code attached to the read data held in the response unit, in response to the arrival of the bit position information transmitted by the bit position designation means, and transmitting the response information to a predetermined uplink in a time slot corresponding to the state of the bit string at the bit position indicated by the arriving bit position information in the identification data held in the response unit;

error inspection means arranged in the control unit for checking for the presence or absence of an error of the response information in each time slot arriving through the uplink, based on the error detection code included in the response information; in each response response information determining means arranged in the control unit for fetching only the response information arriving in a time slot judged to have no error by the error inspection means and determining the response information as effective response information;

identification data judging means arranged in the control unit for judging the identification data of the response unit that has transmitted the response information, from the response information determined effective by the response information determining means;

received result notification means arranged in the control unit for producing the received result information indicating the result of inspection by the error inspection means and the identification data judged by the identification data judging means and transmitting the received result information to the downlink;

repetitive requesting means arranged in the control unit for causing the bit position designation means to transmit the bit position information designating a bit position different from the previously-designated bit position in response to the detection of at least a time slot having an error by the error inspection means;

repetitive response means arranged in each of the response units for causing the response information transmission means to transmit the response information to the uplink in a time slot corresponding to the state of the bit string at the bit position indicated by the bit position information transmitted newly by the bit position designation means in the identification data held in the response unit, in response to the judgement that an error exists in the time slot used by the response information transmission means of the response unit for transmitting the response information in the inspection result information transmitted by the inspection result notification means;

repetitive read designation means arranged in the control unit for designating an arbitrary bit position in the identification data, producing predetermined repetitive read designation information designating a repetitive read mode and transmitting the repetitive read designation information to the downlink, in response to the error inspection means ceasing to detect a time slot having an error;

repetitive read response means arranged in each of the response units for causing the response information transmission means to transmit the response information in response to the arrival of the repetitive read designation information from the repetitive read designation means in the case where the received result information indicating the identification data of the response unit fails to arrive;

repetitive read redesignation means arranged in the control unit for causing the repetitive read designation means to transmit the repetitive read designation information in response to the detection of at least a time slot having an error by the error inspection means;

repetitive read repetitive response means arranged in each of the response units for causing the response information transmission means to transmit the response information to the uplink in a time slot corresponding to the state of the bit string at the bit position indicated by the bit position information transmitted newly by the repetitive read designation means in the identification data held in the response unit, in response to the judgement that an error exists in the time slot used for transmitting the response information by the response information transmission means under the control of the repetitive read response means of the response unit in the inspection result information transmitted by the inspection result notification means; and repetitive read control means arranged in the control unit for causing the repetitive read designation means and the repetitive read redesignation means to repeat the process thereof until the response information ceases to be transmitted from any of the response units, in response to the transmission of the repetitive read designation information by the repetitive read designation means.

The above-mentioned object is realized by a control unit for an information identification system as described below.

According to still another aspect of the invention, there is provided a control unit constituting an information identification system with a plurality of response units having predetermined unique information including at least unique identification data each having binary data of a plurality of bits, and reading predetermined read data in the unique information from the response units, the control unit comprising:

bit position designation means for producing predetermined bit position information designating an arbitrary bit position in the identification data and transmitting the bit position information to a predetermined downlink;

error inspection means for checking for the presence or absence of an error of the response information in each time slot arriving through a predetermined uplink, based on an error detection code included in each of the response information; in each response response information fetching means for fetching only the response information arriving in a time slot judged to have no error by the error inspection means;

inspection result notification means for producing the inspection result information indicating the result of inspection by the error detection means and transmitting the inspection result information to the downlink; and repetitive requesting means for causing the bit position designation means to transmit the bit position information designating a bit position different from the previously-designated bit position, in response to the detection of at least a time slot having an error by the error inspection means.

The object as described above can be realized by a control unit for an information identification system.

According to yet another aspect of the invention, there is provided a control unit constituting an information identification system with a plurality of response units having predetermined unique information including at least unique identification data having binary data of a plurality of bits and reading predetermined read data in the unique information from the response units, the control unit comprising:

bit position designation means for producing predetermined bit position information designating an arbitrary bit position in the identification data and transmitting the bit position information to a predetermined downlink;

error inspection means for checking for the presence or absence of an error of the response information in each time slot arriving through a predetermined uplink, based on an error detection code included in the response information; in each response response information determining means for fetching only the response information arriving in a time slot judged to have no error by the error inspection means and determining the particular response information as effective response information;

identification data judging means for judging the identification data of the response unit that has transmitted the response information, on the basis of the response information determined to be effective by the response information determining means;

received result notification means for producing the received result information indicating the result of inspection by the error inspection means and the identification data judged by the identification data judging means, and transmitting the received result information to the downlink;

repetitive requesting means for causing the bit position designation means to transmit the bit position information designating a bit position different from the previously-designated bit position, in response to the detection of at least a time slot having an error by the error inspection means;

repetitive read designation means for designating an arbitrary bit position in the identification data, producing predetermined repetitive read designation information designating a repetitive read mode and transmitting the repetitive read designation information to the downlink, in response to the error inspection means ceasing to detect at least a time slot having an error;

repetitive read redesignation means for causing the repetitive read designation means to transmit predetermined repetitive read designation information in response to the detection of at least a time slot having an error by the error inspection means; and repetitive read control means causing the repetitive read designation means and the repetitive read redesignation means to repeat the process thereof until the response signal ceases to be transmitted from any one of the response units, in response to the transmission of predetermined bit position information by the bit position designation means under the control of the repetitive read designation means.

The above-described object is realized by a response unit constituting an information identification system.

According to a further aspect of the invention, there is provided at least a response unit constituting an information identification system with a control unit for reading the required information from the response unit, and holding predetermined unique information including at least unique identification data having binary data of a plurality of bits, the response unit comprising:

response information transmission means for producing predetermined response information with a predetermined error detection code attached to predetermined read data in the unique information held in the response unit in response to the arrival of the bit position information transmitted by the bit position designation means from the control unit and transmitting the response information to a predetermined uplink in a time slot corresponding to the state of the bit string at the bit position indicated by the arriving bit position information in the identification data held in the response unit; and repetitive response means for causing the response information transmission means to transmit the response information to the uplink channel in a time slot corresponding to the state of the bit string at the bit position indicated by the bit position information newly transmitted from the control unit in the identification data held in the response unit, in response to the judgement that an error exists in the time slot used by the response information transmission means for transmitting the response information in the inspection result information indicating the inspection result as to the presence or absence of an error of the information in each time slot transmitted by the control unit in the up communication channel.

The object as described above is realized by a response unit constituting an information identification system.

According to a still further aspect of the invention, there is provided at least a response unit constituting an information identification system with a control unit for reading the required information from the response unit, and holding predetermined unique information including at least unique identification data having binary data of a plurality of bits, the response unit comprising:

response information transmission means for producing predetermined response information with a predetermined error detection code attached to predetermined read data including at least a part of the identification data held in the response unit in response to the arrival of the bit position information transmitted by the bit position designation means from the control unit and transmitting the response information to a predetermined uplink in a time slot corresponding to the state of the bit string at the bit position indicated by the arriving bit position information in the identification data held in the response unit;

repetitive response means for causing the response information transmission means to transmit the response information to the uplink in a time slot corresponding to the state of the bit string at the bit position indicated by the bit position information newly transmitted by the bit position designation means in the identification data held in the response unit, in response to the judgement that an error exists in the time slot used by the response information transmission means for transmitting the response information in the predetermined inspection result information indicating the identification data judged by the control unit from the inspection result as to the presence or absence of an error of the information in each time slot of the uplink and from the information in each time slot transmitted from the control unit;

repetitive read response means for causing the response information transmission means to transmit the response information in the case where predetermined repetitive read designation information has arrived from the control unit and in the case where the received result information indicating the identification data of the particular response unit has not yet arrived; and repetitive read repetitive response means for causing the response information transmission means to transmit the response information to the uplink in a time slot corresponding to the state of the bit string at the bit position indicated by the bit position information newly transmitted by the repetitive read designation means in the identification data held in the response unit, in response to the judgement that an error exists in the time slot used by the response information transmission means for transmitting the response information under the control of the repetitive read response means in the inspection result information transmitted from the control unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a diagram showing a format of the down stream.

FIG. 8 is a diagram for explaining a method of securing a pattern and the uniqueness of a sync signal.

FIG. 9 is a diagram showing a format of a down stream in which no information elements are transmitted.

FIG. 10 is a diagram showing the correspondence between the bit assignment for a type code and the contents of the type code.

FIG. 30 is a diagram showing a configuration of the ID data composed of 8 bytes.

FIG. 31 is a diagram showing a format of the read result information.

FIG. 32 is a diagram showing an example of the determined ID data.

FIG. 33 is a diagram showing a specific example of the read result information.

FIG. 34 is a diagram showing an example of the determined ID data.

FIG. 35 is a diagram showing a specific example of the read result information.

FIG. 45 is a diagram showing an example of the state of the low-order 8 bits of the determined ID data.

FIGS. 46A, 46B, 46C, 46D are diagrams showing a format of the information for notifying only a low-order part of the ID data from the control unit 1 to the response units 2.

DETAILED DESCRIPTION OF THE INVENTION

Now, embodiments of the present invention will be explained with reference to the accompanying drawings.
(First embodiment)

Figure 1:
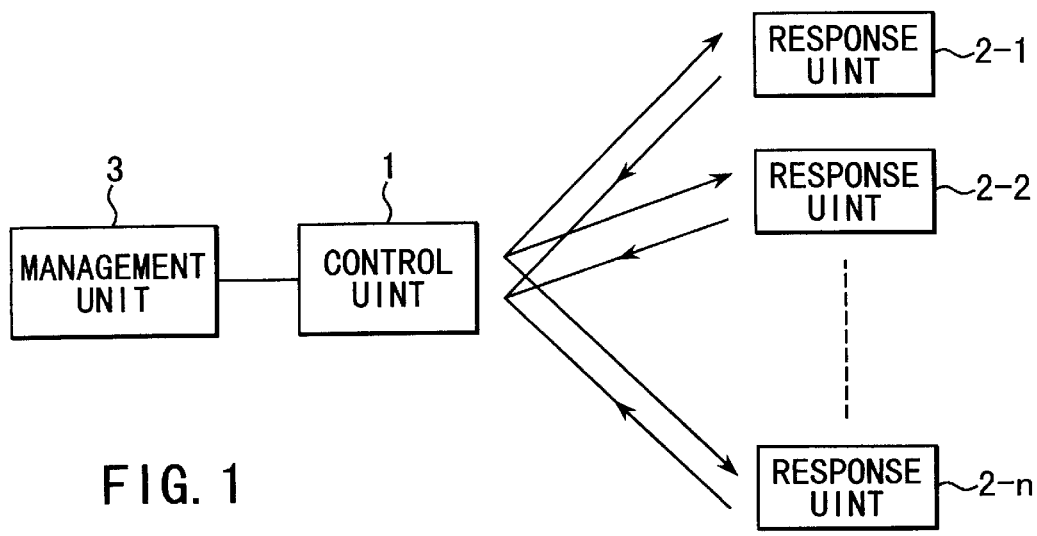
FIG. 1 is a block diagram showing a general configuration of an information ID system according to a first embodiment of the present invention.

FIG. 1 is a block diagram showing a general configuration of an information ID system according to a first embodiment of the present invention.

As shown in FIG. 1, the information ID system according to this embodiment is such that a control unit 1 collectively reads the unique information held in n (n: random number) response units 2 (2-1, 2-2, . . . , 2-n). The control unit 1 is connected with a management unit as required.

The control unit 1 applies a down stream representing an enquiry and an instruction to the response units 2 thereby to read the unique information held in the response units 2. Also, when required, the control unit 1 instructs information to be written into the memory section in the response units 2.

The response units 2 each hold unique information including at least unique ID data (24-bit binary data, for example) in the internal storage section thereof, and in response to an enquiry or an instruction from the control unit 1, transmits a response signal representing at least a part of the unique information in an up stream. Each response unit 2 is mounted on a commodity, for example, and used for identification or management of the commodity.

The management unit 3 is what is called an application computer. The management unit 3 receives the information read by the control unit 1 and processes or manages the information for the response units 2 or the commodities or the like on which the response units 2 are mounted (for example, inventory control of the commodities).

Figure 2:
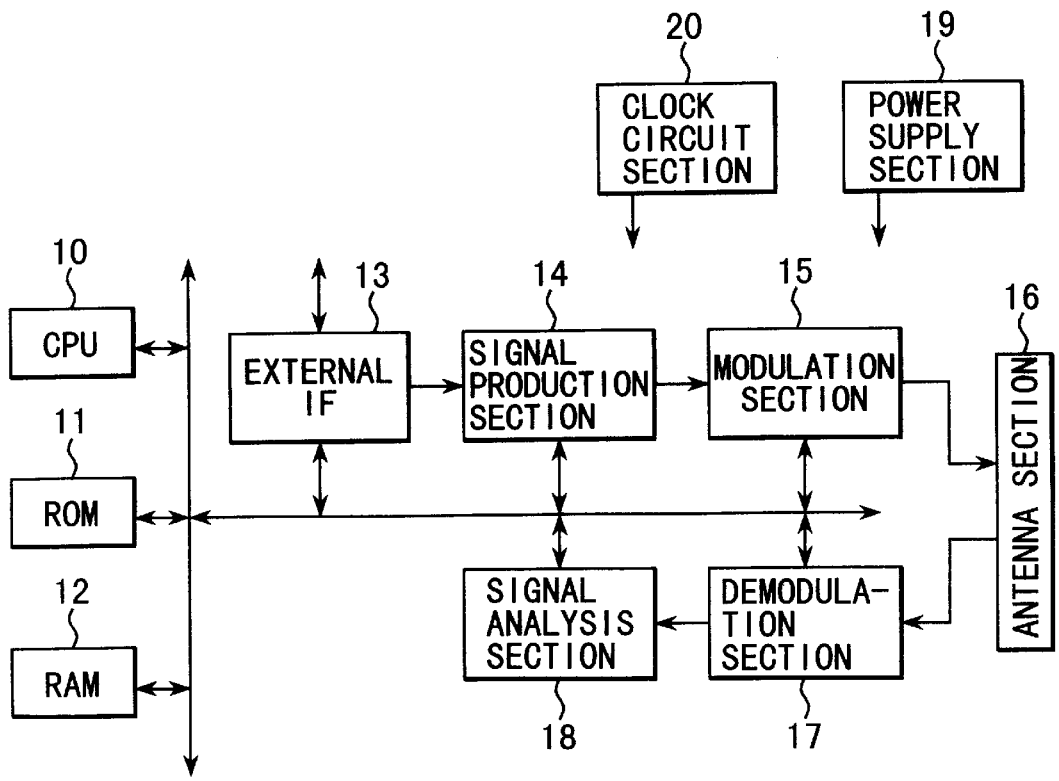
FIG. 2 is a block diagram showing a specific hardware configuration of a control unit 1 in FIG. 1.

FIG. 2 is a block diagram showing a specific configuration of the control unit 1.

As shown in FIG. 2, the control unit 1 includes a CPU 10, a ROM 11, a RAM 12, an external interface 13, a signal production section 14, a modulation section 15, an antenna section 16, a demodulation section 17, a signal analysis section 18, a power supply section 19 and a clock circuit section 20.

The CPU 10 operates according to the operation program stored in the ROM 11, collectively controls the parts of the control unit 1 and performs various functions for reading the unique information from the response units 2.

The ROM 11 holds the operation program described above for the CPU 10 and other necessary information.

The RAM 12 is used for temporarily storing various information required for various processings executed by the CPU 10.

The external interface 13, which is connected with the management unit 3, fetches the instructions and information supplied from the management unit 3 and outputs information to the management unit 3.

The signal production section 14 produces a down stream containing various information to be supplied to the response units 2, under the control of the control unit control section 110. The down stream produced by the signal production section 14 is modulated in the modulation section 15 for radio transmission and sent out into the space toward the response units 2 from the antenna section 16.

The signal (up stream) sent out from the response units 2 and arriving through the space, on the other hand, is received by the antenna section 16, and after being demodulated in the demodulation section 17, is applied to the signal analysis section 18. The signal analysis section 18 analyzes the up stream supplied from the demodulation section 17, judges the various information contained in the signal, and applies the result of judgement to the control unit control section 110.

The power supply section 19 acquires power from a commercial power supply, for example, and converts it to the power used for operating the various parts of the control unit 1, and supplies it to the various parts of the control unit 1.

The clock circuit section 20 generates a predetermined clock signal and supplies it to the various parts of the control unit 1.

Figure 3:
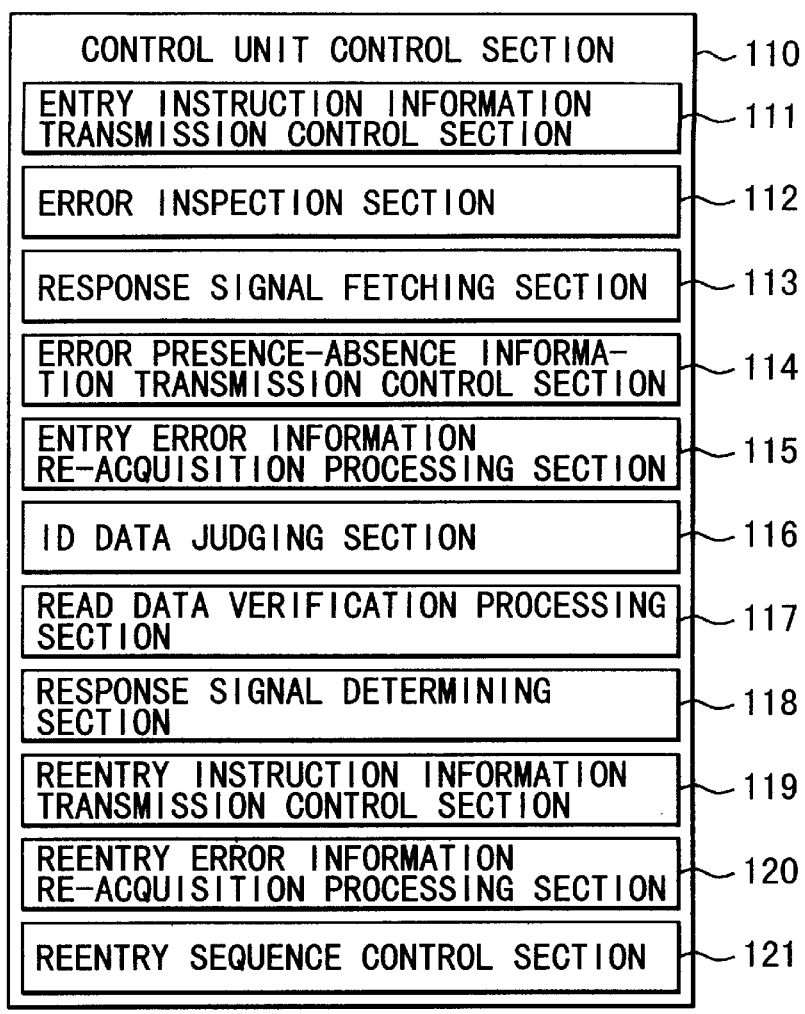
FIG. 3 is a diagram showing a configuration of a control unit control section including a CPU 10, a ROM 11 and a RAM 12 in FIG. 2 according to the first embodiment of the invention.

The CPU 10, the ROM 11 and the RAM 12 make up the control unit control section 110 having various processing sections shown in FIG. 3.

The control unit control section 110 includes an entry instruction information transmission control section 111, an error inspection section 112, a response signal fetching section 113, an error presence-absence information transmission control section 114, an entry error information re-acquisition processing section 115, an ID data judging section 116, a read data verification processing section 117, a response signal determining section 118, a reentry instruction information transmission control section 119, a reentry error information re-acquisition processing section 120 and an entry sequence control section 121.

The entry instruction information transmission control section 111 controls the production and transmission of a down stream containing the entry instruction information for requesting the transmission of a response signal from the response units 2 in the entry sequence described later.

The error inspection section 112 checks whether an error has occurred or not in the response signal judged in the signal analysis section 18 from the up stream received by the antenna section 15 and the demodulation section 17, using the error detection code added in the response signal.

The response signal fetching section 113 fetches only the response signal judged by the error inspection section 112 to have no error as a received response signal, and discards the response signals having an error.

The error presence-absence information transmission control section 114 controls the production and transmission of a down stream containing the error presence-absence information indicating whether or not an error has occurred in the response signal arriving in each of a plurality of time slots set in a cycle as described later.

The entry error information re-acquisition processing section 115 performs the process, in the latest cycle of the entry sequence, for acquiring the response signal transmitted from the response unit 2 in a time slot that has developed an error in the previous cycle.

The ID data judging section 116 judges the ID data held in the response unit 2 which has transmitted a received response signal fetched by the response signal fetching section 113.

The read data verification processing section 117 performs the process for verifying whether a response signal has been transmitted or not for each of the response units 2 having the ID data judged by the ID data judging section 116, based on the received response signal fetched by the response signal fetching section 113 during a current entry sequence period after completion of the particular entry sequence.

The response signal determining section 118 determines, as an effective response signal, only the received response signal providing the basis of judgement of the ID data held in the response unit 2 judged to have transmitted the response signal by the read data verification processing section 117.

The reentry instruction information transmission control section 119 controls the production and transmission of a down stream containing the reentry instruction information for requesting the transmission of a response signal from the response unit 2 in the reentry sequence described later.

The reentry error information re-acquisition processing section 120 performs, in the latest cycle of the reentry sequence, the process for acquiring the response signal that has been transmitted from the response unit 2 in a time slot that has developed an error in the previous cycle.

The reentry sequence control section 121 causes the reentry instruction information transmission control section 119 and the entry error information re-acquisition processing section 120 to repeat the process thereof until the response signal ceases to be sent out from any of the response units 2 in response to the transmission of a down stream containing the reentry instruction information.

Figure 4:
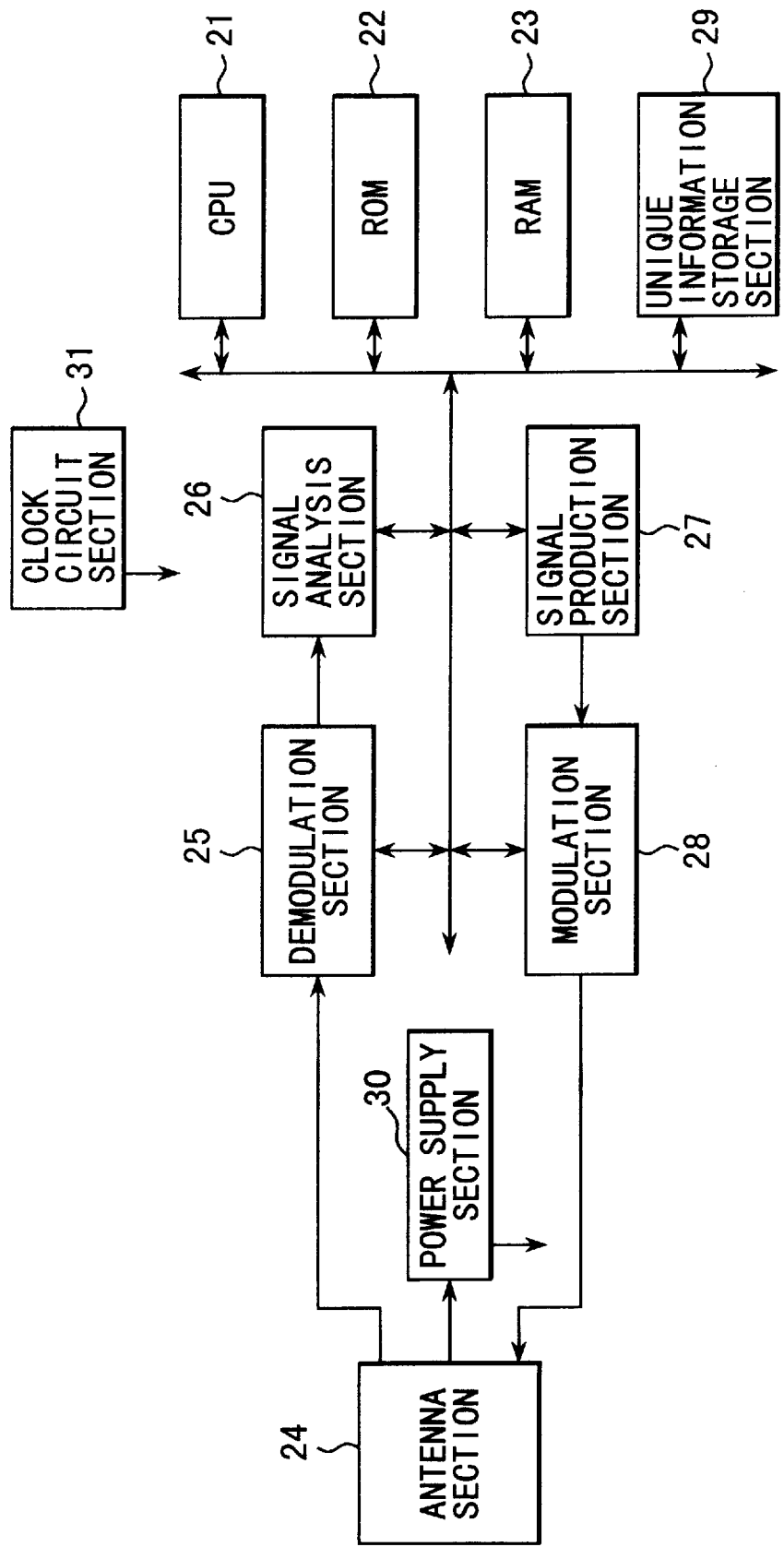
FIG. 4 is a block diagram showing a specific hardware configuration of the response units in FIG. 1.

FIG. 4 is a block diagram showing a specific configuration of the response units 2.

A shown in FIG. 4, each response unit 2 includes a CPU 21, a ROM 22, a RAM 23, an antenna section 24, a demodulation section 25, a signal analysis section 26, a signal production section 27, a modulation section 28, a unique information storage section 29, a power supply section 30 and a clock circuit section 29.

The CPU 21 operates based on the operation program stored in the ROM 22 and controls all the parts of the response unit 2 collectively thereby to perform the function of transmitting a response signal in response to a request from the control unit 1.

The ROM 22 holds the above-mentioned operation program and other required information for the CPU 21.

The RAM 23 is used for storing temporarily various information required for the various processings executed by the CPU 21.

The down stream sent out from the control unit 1 and arriving through the space is received by the antenna 24, and after being demodulated in the demodulation section 25, is applied to the signal analysis section 26. The signal analysis section 26 analyzes the down stream supplied thereto from the demodulation section 25, judges the various information contained in the particular signal, and applies the result of judgement to the response unit control section 210.

The signal production section 27 produces a response signal representing the response signal supplied to the control unit 1 under the control of the response unit control section 210. The signal produced in the signal production section 27 is modulated in the modulation section 28 for radio transmission, and sent out into the space toward the control unit 1 from the antenna section 24.

The unique information storage section 29 stores the unique information of the particular response unit 2.

The power supply section 30 is charged by the power generated upon receipt of the transmission signal of the control unit 2 received by way of the antenna section 24. This power is converted into the power for operating the various parts of the response unit 2 and supplied to the various parts of the response unit 2.

The clock circuit section 31 generates a predetermined clock signal and supplies it to the various parts of the response unit 2.

Figure 5:
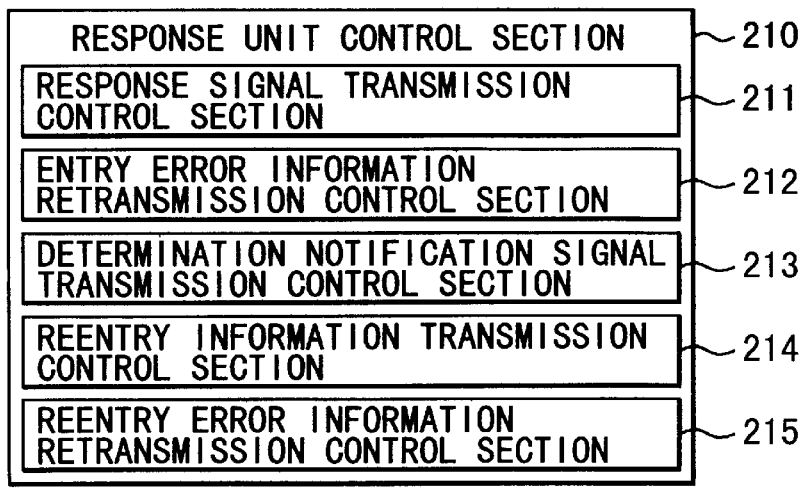
FIG. 5 is a diagram showing a configuration of a response unit control section 210 including a CPU 21, a ROM 22 and a RAM 23 in FIG. 4 according to the first embodiment.

The CPU 21, the ROM 22 and the RAM 23 make up a response unit control section 210 having various processing sections as shown in FIG. 5.

The response unit control section 210 realizes a response signal transmission control section 211, an entry information retransmission control section 212, a determination notification signal transmission control section 213, a reentry information transmission control section 214 and a reentry error information retransmission control section 215.

The response signal transmission control section 211 produces a response signal and performs the control operation for transmitting the response signal in a time slot determined from the contents of entry instruction information and the ID data held in the local unit, in the case where the signal analysis section 26 judges the entry instruction information.

The entry error information retransmission control section 212 monitors the error presence-absence information judged by the signal analysis section 26 in the cycle immediately following the transmission of the response signal, during the period of the entry sequence. In the case where the time slot used for transmission of the response signal is judged to have an error in accordance with the error presence-absence information, the entry error information retransmission control section 212 performs the control operation for retransmitting the response signal in a time slot determined from the contents of the entry instruction information judged by the signal analysis section 26 and the ID data held in the local unit in the particular cycle.

The determination notification signal transmission control section 213 controls the production and transmission of the determination notification signal containing the determination notification signal indicating whether the response signal has been transmitted during the immediately preceding entry sequence period, in response to the judgement by the signal analysis section 26 of the information destined to the local unit requesting the determinating whether the response signal is transmitted or not after completion of the entry sequence.

In the case where the reentry sequence is started after a complete entry sequence without judging by the signal analysis section 26 of the information requesting the determination whether the response signal has been transmitted, the entry information transmission control section 214 performs the control operation for retransmitting the response signal in a time slot determined from the contents of the reentry instruction information and the ID data held in the local unit, in response to the judgement of the reentry instruction information by the signal analysis section 26 during the reentry sequence period.

In the case where the signal analysis section 26 judges that the time slot used for transmission of the response signal has an error based on the error presence-absence information in the cycle immediately following the response signal transmission during the reentry sequence period, the reentry error information retransmission control section 215 performs the control operation for retransmitting the response signal in a time slot determined from the contents of the reentry instruction information determined in the signal analysis section 26 in the same cycle and the ID data held in the local unit.

In the information ID system according to this embodiment having the above-mentioned configuration, the signal transmission between the control unit 1 and the response units 2 is conducted as described below.

Figure 6:
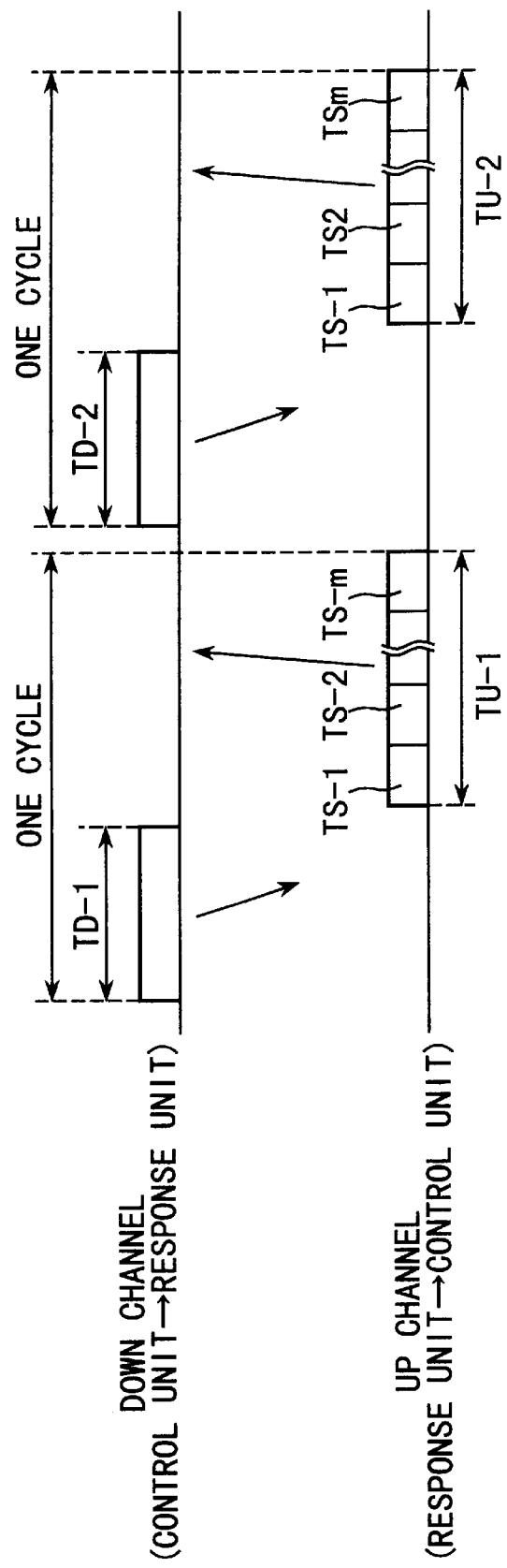
FIG. 6 is a diagram showing the relation between a period TD during which the control unit 1 transmits a down stream and a period TU during which the response units 2 transmit a signal.

First, as shown in FIG. 6, a temporal lag exists between a period TD (TD-1, TD-2, and so on) during which the control unit 1 transmits a down stream and a period TU (TU-1, TU-2, and so on) during which the response unit 2 transmits a signal. Specifically, a predetermined (variable) period TU during which the response units 1 transmit a signal is set following the period during which the control unit 1 has completely transmitted the down stream. A given period TD and the period TU immediately following the particular period TD constitute a pair, and the combined period is defined as one cycle. This cycle is repeated a plurality of times during a series of read operations.

The period TU during which the response units 2 transmit a signal, as described later, includes a plurality of time slots TS (TS-1, TS-2, . . . , TS-m) (in the variable number of m) set on the same communication channel. A different response unit 2 transmits the response signal in a different time slot. The response signals transmitted by each response unit 2 are arranged in burst and thus form an up stream.

The down stream transmitted by the control unit 1 has a format shown in FIG. 7.

As shown in FIG. 7, the down stream includes a sync signal (SYN) and a control signal (CNT). Further, the control signal includes a type code (MOD), an information element length data (LEN) and information elements.

The sync signal, as shown in FIG. 8, constitutes a bit string "01111110". It is seen from FIG. 8 that in the case where six successive 1 s exist in the control signal, "0" is inserted between the fifth "1" and the sixth "1" thus making a unique pattern of the sync signal.

In the case where the information elements are not transmitted, the format of the down stream is a succession of sync signals as shown in FIG. 9.

The type code is an 8-bit binary code, and a predetermined one of the type codes is inserted as shown in FIG. 10. Specifically, in a type code, "00000001" to "00001111" indicate the entry sequence. Further, the numerical value represented by the low-order four bits indicates the order of the cycle in the entry sequence. Also, in a type code, "00010001" to "00011111" indicates a reentry sequence, in which the low-order four bits indicate the order of cycle in the reentry sequence. Furthermore, in a type code, "00100000" indicates the instruction (polling) to a specified response unit 2 alone.

Figure 11A:
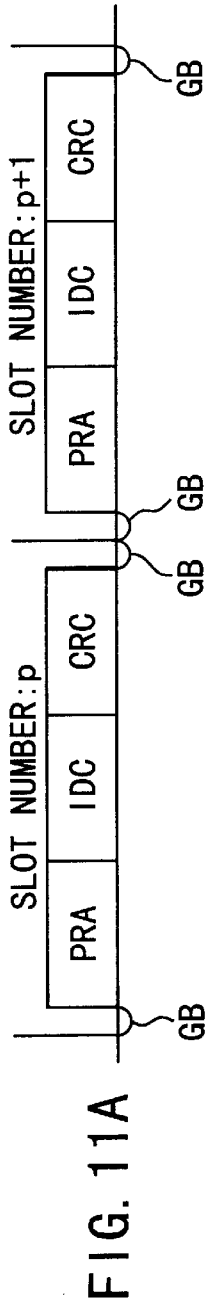
FIGS. 11A, 11B are diagrams showing a format of an up stream.
Figure 11B:
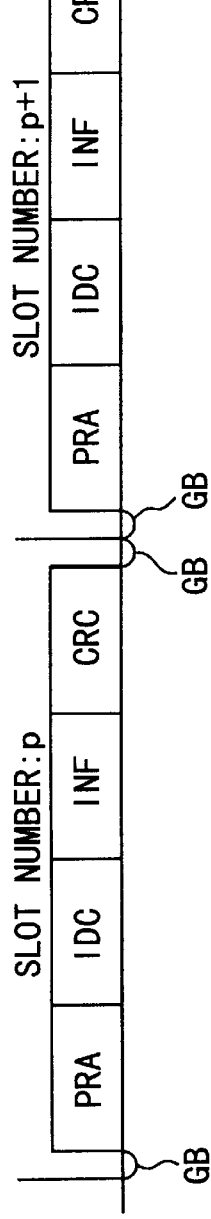

As shown in FIGS. 11A, 11B, on the other hand, the up stream includes a response signal transmitted by a response unit 2, which response signal is inserted in at least a part of a plurality of time slots. The response signal is inserted in a time slot while securing a guard band (GB) of a predetermined time length immediately before and immediately after the response signal.

Also, the response signal includes a preamble signal (PRA), an ID signal (IDC) and an error detection code (CRC) in some cases as shown in FIG. 11A, or includes a preamble signal (PRA), an ID signal (IDC), additional information (INF) and an error detection code (CRC) in other cases as shown in FIG. 11B.

Now, an explanation will be given of the operation of an information ID system configured as mentioned above.

First, the control unit 1 is capable of reading or writing unique information individually for a response unit 2 for which the ID data is known.

Figure 12:
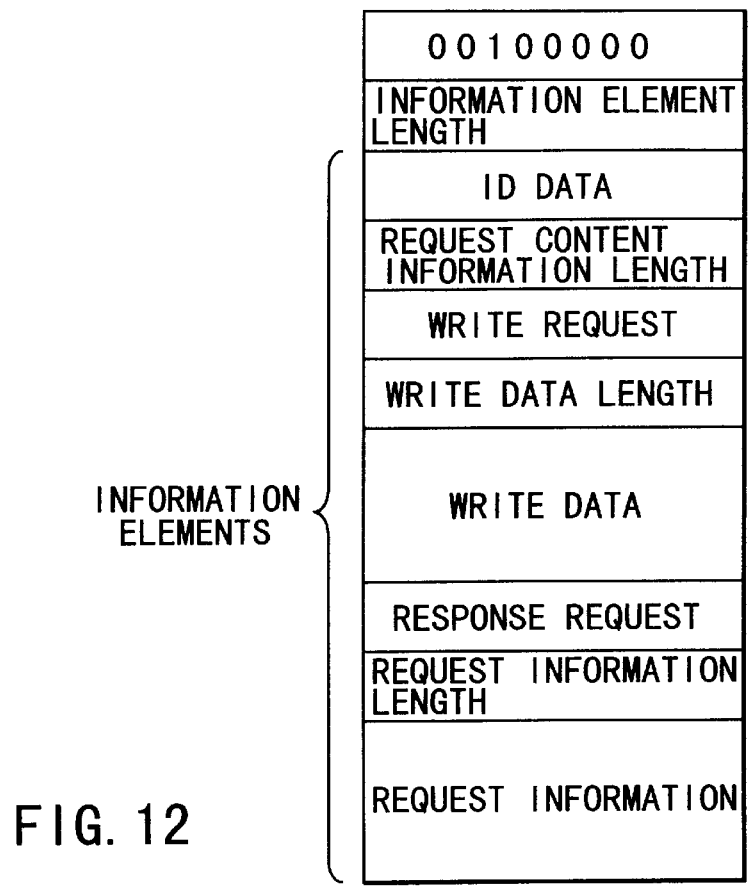
FIG. 12 is a diagram showing a format of a control signal used for the polling.

In the case where unique information is read or written individually in this way, the control unit control section 110 sets the type code to "00100000" designating the polling mode, while at the same time controlling the signal production section 14 in such a manner as to produce a down stream including a control signal having inserted therein the information elements such as the ID data, the requested data length information, the write request data, the write data length information, the write data, the response request data, the requested data length information and the request data, as shown in FIG. 12. The ID data is used for the response unit 2 from and into which the unique information is read or written. The requested data length information indicates the length of the subsequent data (data indicating the contents of the request). The write request data indicates that the process requested is the write operation of the unique information. The write data length information indicates the length of the write data. The write data indicates the type and contents of the information (the ID data and additional information such as arbitrary commodity information and management information) stored in the unique information storage section 29 of the response unit 2. The response request data indicates that the operation requested is the processing of the response. The request data length information indicates the length of the request data. The request data indicates the contents of the response processing requested (request for transmitting the ID data and the additional information, the request for transmission of the determination notification signal, etc.).

The control unit control section 110 causes the down stream produced in the signal production section 14 to be modulated in the modulation section 15 and transmitted by the antenna section 16.

In the response units 2, upon receipt of the down stream by the antenna section 24 and the demodulation section 25 and with the arrival of various information contained in the control signal from the signal analysis section 26, the response unit control section 210 recognizes the polling mode from the type code.

In the case where the polling mode is designated this way, the response unit control section 210 judges whether the ID data contained in the control signal coincides with the ID data held in itself. In the case of no-coincidence, no processing is executed in the current cycle. In the case where the ID data contained in the control signal is coincident with the ID data held in itself, in contrast, the response unit control section 210 writes the write data contained in the control signal in the unique information storage section 29. The response unit control section 210 also fetches from the unique information storage section 29 the information requested in the request data contained in the control signal and controls the signal production section 27 in such a manner as to produce a response signal containing the particular information. The response unit control section 210 causes the response signal produced by the signal production section 27 to be modulated by the modulation section 28 and transmitted by the antenna 24.

Now, in the control unit 1, the control unit control section 110 waits for the arrival of the response signal upon complete transmission of the down stream, in response to the issuance of the above-mentioned response request. Consequently, when the response signal transmitted from any one of the response units 2 as described above is received by the antenna section 16 and the demodulation section 17 and when the various information contained in the response signal are applied from the signal analysis section 18, the particular information are stored in the RAM 12. Also, the information stored in the RAM 12 are supplied as required to the management unit 3 through an external interface 13.

Now, an explanation will be given of the operation of the control unit 1 reading the unique information of an arbitrary response unit 2 existing in a predetermined read range (the range where an up stream and a down stream can be transmitted and received).

In the process, the control unit control section 110 in the control unit 1 starts the entry sequence for reading the unique information of all the response units 2 existing in the read range.

Figure 13:
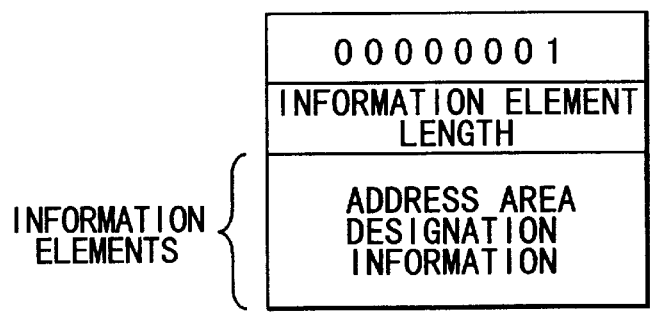
FIG. 13 is a diagram showing a format of a control signal used in the first cycle of entry sequence.

In the first cycle of the entry sequence, the control unit control section 110 sets the type code to "00000001" indicating the first cycle of the entry sequence, while at the same time controlling the signal production section 14 in such a manner as to produce a down stream containing a control signal as shown in FIG. 13 having inserted therein the information elements with the address area designation information. The control unit control section 110 causes the down stream produced by the signal production section 14 to be modulated by the modulation section 15 and transmitted by the antenna section 16.

Figure 14:
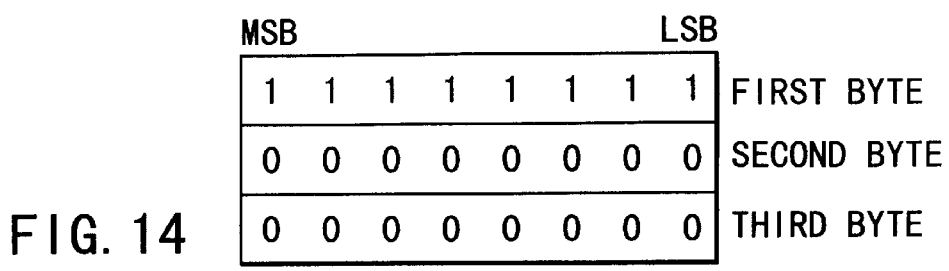
FIG. 14 is a diagram showing an example of address area designation information.

The address area designation information, as shown in FIG. 14, has three bytes (24 bits) and each bit thereof corresponds to a bit position in the ID data of the response unit 1. The number of bits "1" in the address area designation information indicates the number of time slots to be used by each response unit 2 to transmit the response signal in the current cycle. Also, the arrangement of the bits "1" in the address area designation information indicates the assignment of time slots to be used for each response unit 2 to transmit the response signal. Specifically, assuming that the number of bits "1" in the address area designation information is m, $2^m$ time slots are available. Also, the number of states that m bits constituting the ID data can take is $2^m$. If the m bits recovered from the ID data is regarded as an m-bit binary data item, the above-mentioned $2^m$ states can be expressed as 0 to $2^m-1$ in decimal notation. In view of this, the $2^m$ time slots are assigned the time slot numbers 0 to $2^m-1$, respectively. Also, the bit string corresponding m bits at the position designated by the address area designation information in the ID data is regarded as an m-bit binary data item. The time slot assigned the time slot number coincident with the value of the binary data is assigned to the response unit 2 having the ID data of the source from which the particular binary data are extracted.

Figure 15:
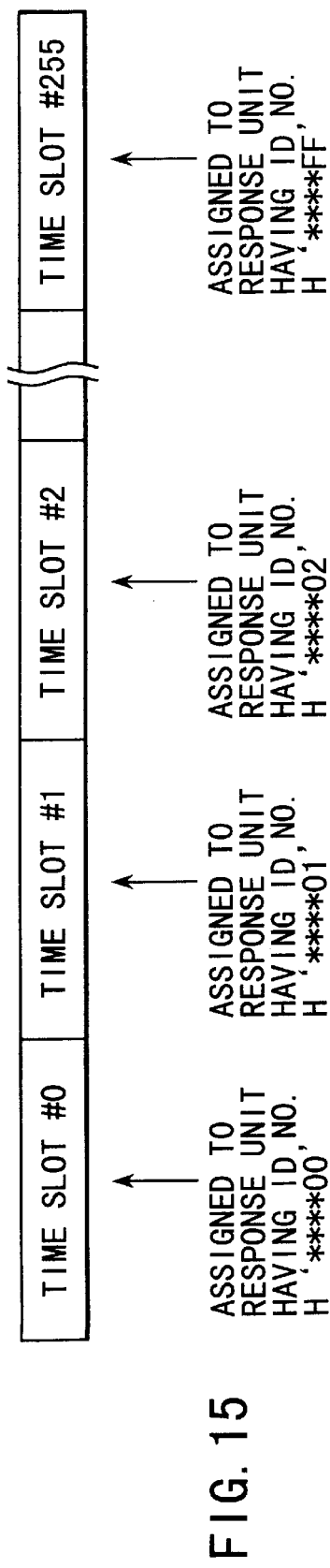
FIG. 15 is a diagram showing the setting and assignment of time slots at a given time when the address area designation information assumes the state shown in FIG. 14.

Specifically, as shown in FIG. 14, in the case where the 8 bits of the first byte are set to "1" in the address area designation information, it indicates that 256 (=$2^8$) time slots assigned the time slot numbers #0 to #255 are set sequentially as shown in FIG. 15. It also indicates that each time slot is assigned to the response unit 2 having an ID number coincident with the time slot number on the assumption that the least-significant byte of the ID number constitutes an 8-bit binary data item. In other words, the time slot having the #0 time slot number is assigned to the response unit 2 having the ID data having the least-significant byte of "00000000" ("H'**00' in) in hexadecimal notation. Also, the time slot having the #1 time slot number is assigned to the response unit 2 having the ID data having the least-significant byte of "00000001" ("H'**01' in hexadecimal notation). In the ID data represented in the hexadecimal notation, "*" indicates that the value can be arbitrary.

The above-mentioned process is executed by the entry instruction information transmission control section 111.

Now, the response unit control section 210 in the response unit 2, upon receipt of the above-mentioned down stream by way of the antenna section 24 and the demodulation section 25 and with the arrival of the various information contained in the control signal from the signal analysis section 26, recognizes the first cycle of the entry sequence from the type code. At the same time, the response unit control section 210 initializes the state thereof.

Then, the response unit control section 210 judges a time slot assigned to the response unit 2 associated with itself based on the address area designation information. The response unit control section 210 then recovers the required unique information from the unique information storage section 29 and controls the signal production section 27 in such a manner as to produce a response signal containing the particular unique information. The ID data is indicated in the response signal in the form lacking the bit position indicated by the address area designation information. The response unit control section 210 causes the response signal produced by the signal production section 27 to be modulated by the modulation section 28 and transmitted by the antenna 24 at the timing of the time slot thus judged.

The above-mentioned process is executed by the response signal transmission control section 211.

In the first cycle of the entry sequence, a time slot is assigned in accordance with the least-significant byte of the 3-byte ID data. As a result, it may occur that a plurality of response units 2 are assigned to a single time slot.

Figure 16:
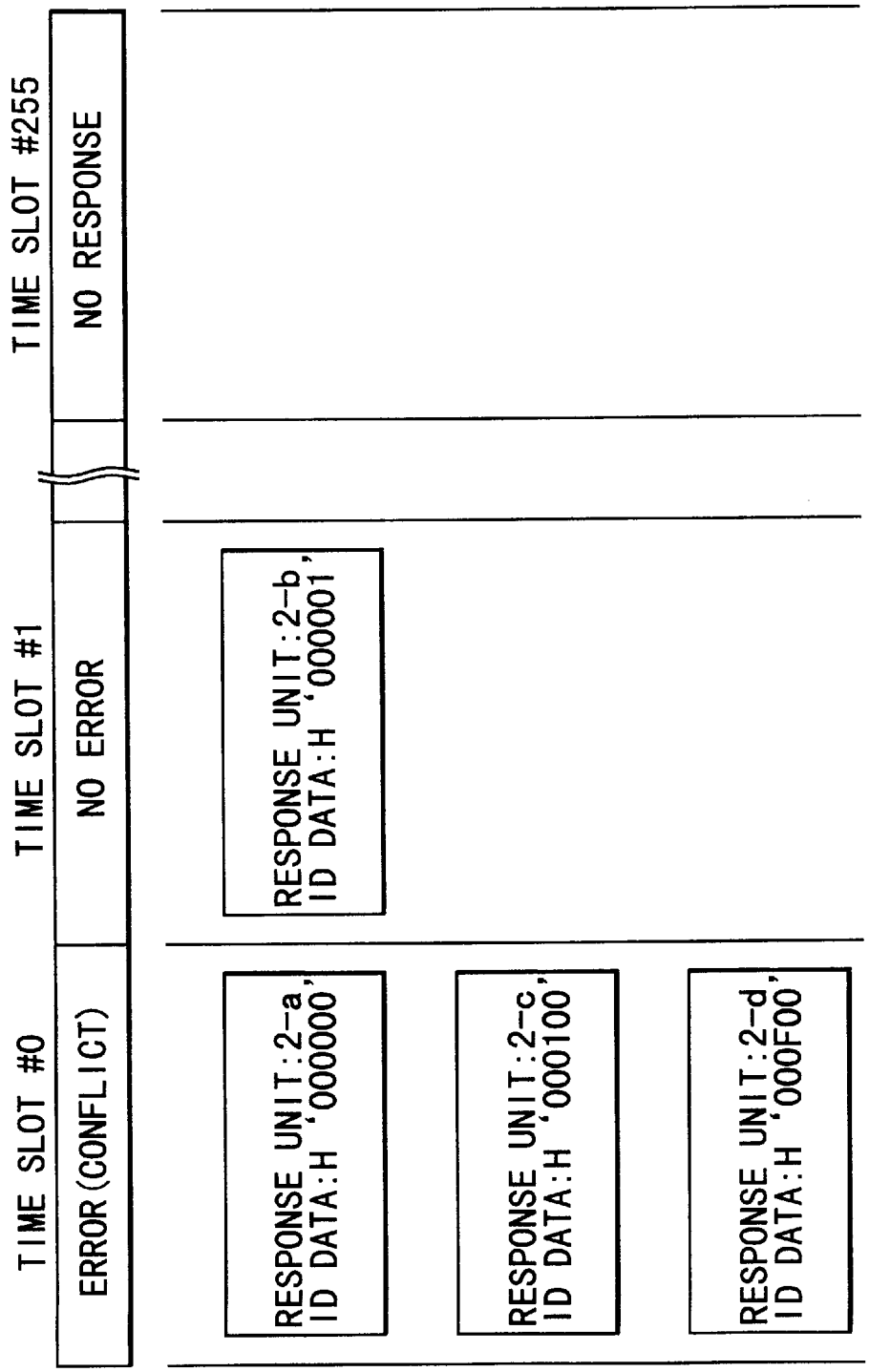
FIG. 16 is a diagram showing a specific example of a conflict occurring in the case where the time slots are set and assigned in the manner shown in FIG. 14.

Specifically, assume that the read range has existing therein a response unit 2-a having the ID data H'000000', a response unit 2-b having the ID data H'000001', a response unit 2-c having the ID data H'000100', and a response unit 2-d having the ID data H'000F00'. In such a case, as shown in FIG. 16, only the response unit 2-b transmits the response signal and therefore no conflict occurs in the time slot of time slot number #1. As a result, the response signal transmitted from the response unit 2-b is received free of error in many cases by the control unit 1. In the time slot of time slot number #0, however, the response signal is transmitted by the response unit 2-a, the response unit 2-c and the response unit 2-d. As a result, a conflict occurs so that the response signal received in the control unit 1 develops an error in many cases.

In view of this, in the control unit 1, the control unit control section 110 causes the error inspection section 112 to check whether an error has occurred or not, using the error detection code added to the response signal arriving in each time slot of the up stream. The control unit control section 110 causes the response signal fetching section 113 to fetch as a received response signal the response signal judged to have no error by the error inspection, while discarding any response signal judged to have developed an error.

Then, the control unit control section 110 recovers the ID data from the received response signal thus fetched. The ID data contained in the received response signal is partially not shown. The state of the part not shown is uniquely determined by the time slot in which the response signal has arrived. The control unit control section 110 thus causes the ID data judging means 116 to judge the ID data in complete form.

Specifically, as shown in FIG. 17a, for example, assume that a response signal arrives in time slots #1 to #4 and that the response signals that have arrived in the time slots #2 and #4 have no error. In such a case, the control unit control section 110 fetches as a received response signal the response signal arriving in the time slots #2 and #4, while discarding the response signals arriving in the time slots #1 and #3. In view of the fact that the ID data contained in the response signal arriving in the time slot #2 is H'$w_1x_1y_1z_1$', the control unit control section 110 adds H'02' corresponding to the time slot number #2 to the low-order side. Thus, the ID data of the response unit 1 that has transmitted the response signal is judged as "H'$w_1x_1y_1z_1$02'. Also, in view of the fact that ID data contained in the response signal arriving in the time slot #4 is H'$w_2x_2y_2z_2$', the control unit control section 110 adds H'04' corresponding to the time-slot number #4 on the low-order side, and in this way judges that the ID data of the response unit 2 that has transmitted the particular response signal as H'$w_2x_2y_2z_2$04'.

Figure 18:
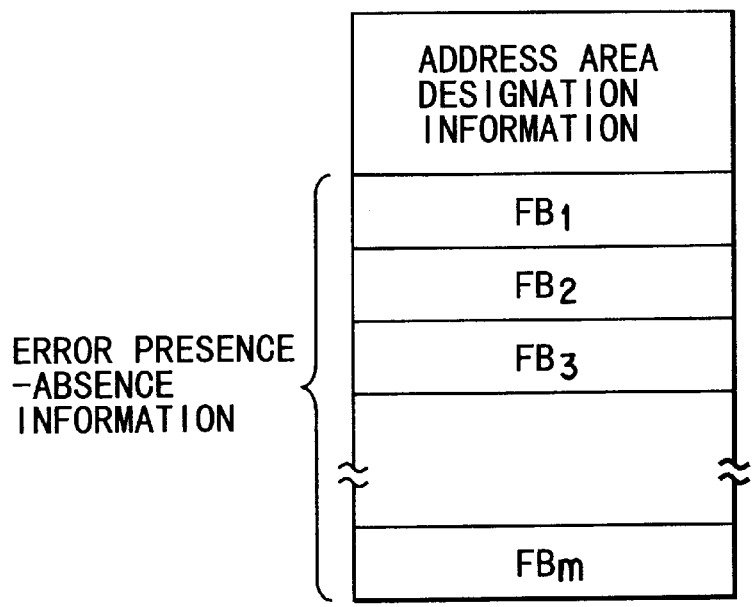
FIG. 18 is a diagram showing a format of the information elements in the control signal in the second and subsequent cycles of the entry sequence.

Then, the control unit control section 110 transfers to the second cycle of the entry sequence. The control unit control section 110 sets the type code to "00000010" indicating the second cycle of the entry sequence, while at the same time controlling the signal production section 14 in such a manner as to produce a down stream including the control signal as shown in FIG. 18 in the information elements. The control unit control section 110 then causes the modulation section 15 to modulate the down stream produced by the signal production section 14, and causes the signal to be transmitted by the antenna section 16.

The information elements for the second cycle of the entry sequence have error presence-absence information in addition to the address area designation information.

The error presence-absence information includes flag bits ($FB_1$ to $FB_m$) indicating the judgement as to whether the response signal has an error for each time slot set in the previous cycle (first cycle). In other words, a total of 256 flag bits indicating the judgement as to whether a response signal has an error for each of the 256 time slots set in the first cycle of the entry sequence are indicated in the same order as the corresponding time slots.

The control unit control section 110 produces the error presence-absence information corresponding to the result of the error inspection conducted by the error inspection section 112 and applies the error presence-absence information thus produced to the signal production section 14. Also, the control unit control section 110 causes the address area designation area information to designate a bit position different from that in the first cycle of the entry sequence.

Figure 17:
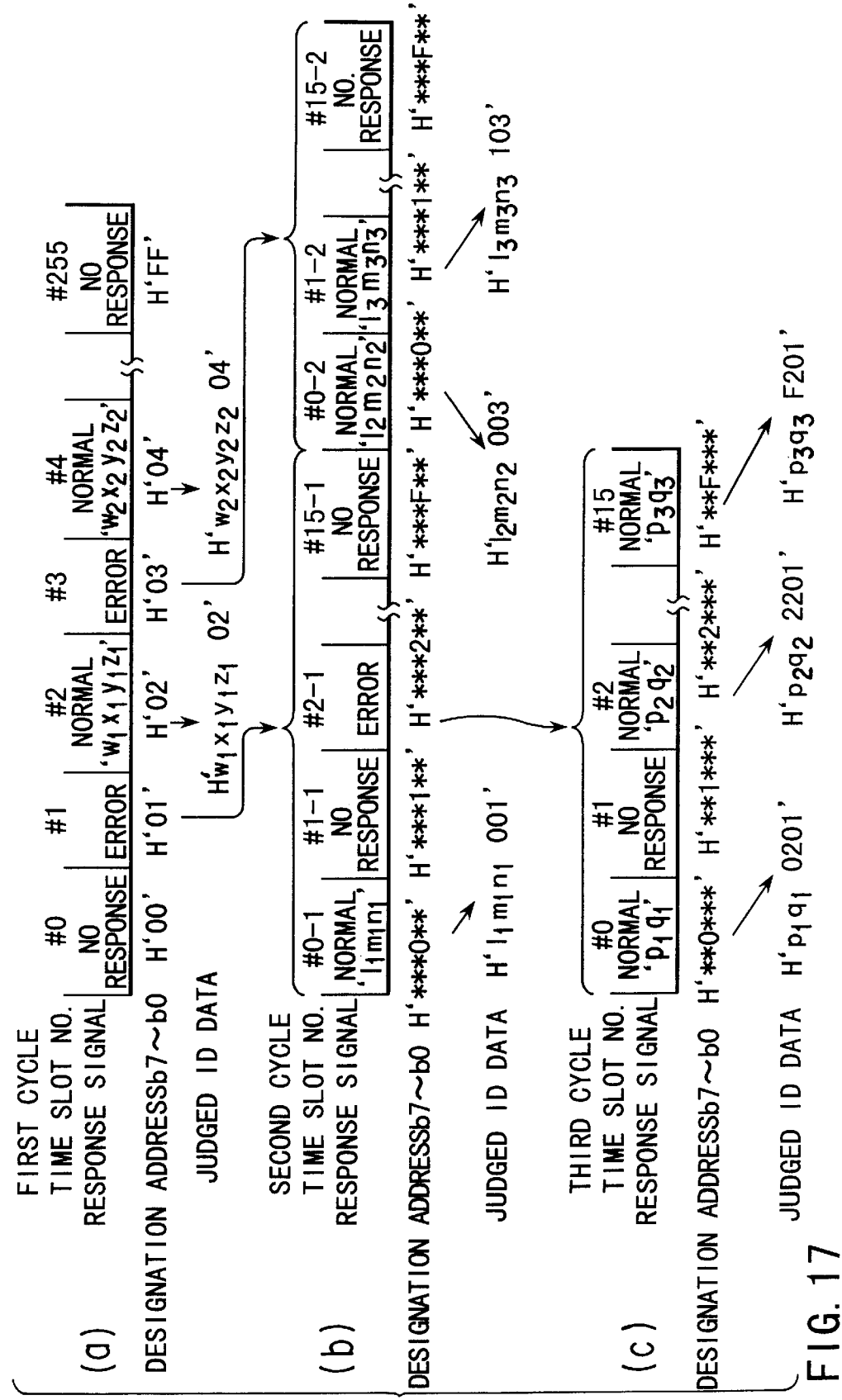
FIG. 17 is a diagram showing a specific example of the change in the setting and assignment of time slots in the entry sequence and the manner in which the ID data is judged.
Figure 19:
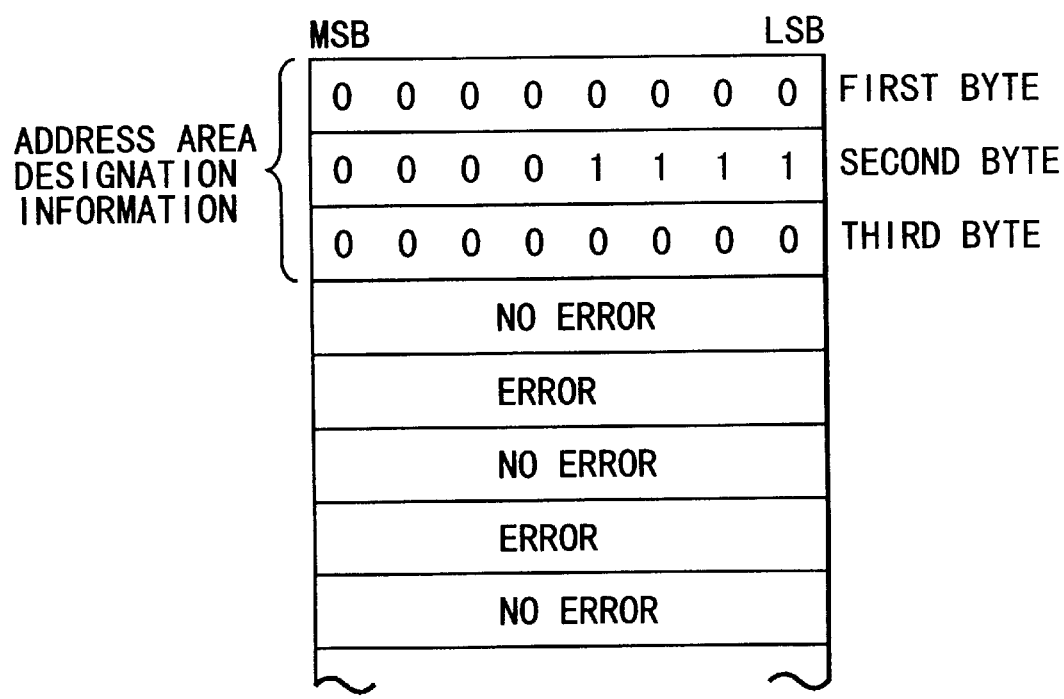
FIG. 19 is a diagram showing a specific example of the information elements in the control signal in the second and subsequent cycles of the entry sequence.

Specifically, as shown in FIG. 19, assume that the low-order four bits of the second byte in the address area designation information are set to "1". Also assume that the up stream is received in the first cycle of the entry sequence in the state (a) as shown in FIG. 17. Then, the error presence-absence information assumes a state as shown in FIG. 19.

The above-mentioned process is executed by the error presence-absence information transmission control section 114 and the entry error information re-acquisition processing section 115.

Now, the response unit control section 210 in the response unit 2, upon receipt of the above-mentioned down stream by way of the antenna section 24 and the demodulation section 25 and with the arrival of various information contained in the control signal from the signal analysis section 26, recognizes the second cycle of the entry sequence from the type code. In the process, the response unit control section 210, if it has transmitted a response signal in the previous cycle, judges from the error presence-absence information as to whether an error has developed in the time slot used for transmission of the particular response signal.

Unless an error has developed in the time slot used for transmission of the response signal, the response unit control section 210 sends out no response signal during the subsequent period of entry sequence. In the case where an error has developed in the time slot used for the transmission of the response signal, in contrast, the response unit control section 210 judges a time slot assigned to the response unit 2 associated with itself based on the address area designation information. The response unit control section 210 then recovers the required unique information from the unique information storage section 29, and controls the signal production section 27 in such a manner as to produce a response signal containing the particular unique information. The ID data, however, is indicated in the response signal in the form lacking the bit position indicated in the address area designation information supplied in the previous cycles. The response unit control section 210 causes the response signal produced by the signal production section 27 to be modulated by the modulation section 28 at the timing of the above-judged time slot and transmitted by way of the antenna section 24.

The foregoing process is executed by the entry error information retransmission control section 212.

The address area designation information, as in the first cycle of the entry sequence, indicates the number of time slots to be used by each response unit 2 for transmitting the response signal in the current cycle according to the number of bits "1" in the address area designation information. Also, the arrangement of bits "1" in the address area designation information indicates the assignment of time slots to be used by each response unit 2 to send out the response signal.

Figure 20:
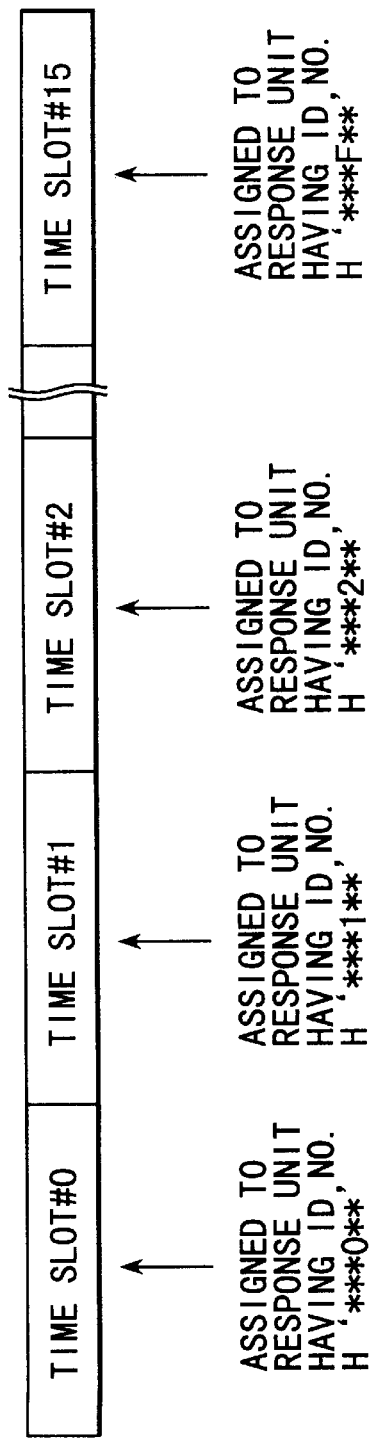
FIG. 20 is a diagram schematically showing the setting and assignment of time slots in the case where the address area designation information is in the state shown in FIG. 19.

Specifically, in the case where the low-order four bits in the second byte are "1" in the address area designation information shown in FIG. 19, it indicates that 16 (=$2^4$) time slots are set with the time slot numbers #0 to #15 attached thereto in that order as shown in FIG. 20. It also indicates that the time slot assigned the time slot number coincident with the value based on the assumption that the low-order four bits in the second byte of the ID number are binary data is assigned to the response unit 2 having the ID data of the source of the binary data. In other words, the time slot of the time slot number #0 indicates the assignment to the response unit 2 having the ID data in which the low-order four bits of the second byte are "0000" (H'*0' in hexadecimal notation). Further, the time slot of the time slot number #1 indicates the assignment to the response unit 2 having the ID data in which the low-order four bits of the second byte are "0001"(H'*0' in hexadecimal notation).

In the second and subsequent cycles of the entry sequence and each cycle of the reentry sequence, however, the above-mentioned 16 time slots are set for each of the time slots that have developed an error in the previous cycle. Consequently, in the second and subsequent cycles of the entry sequence and each cycle of the reentry sequence, therefore, time slots are set in the number equivalent to the product of the number determined by the number of the bits "1" in the address area designation information and the number of the time slots that have an error in the previous cycle.

Figure 21:
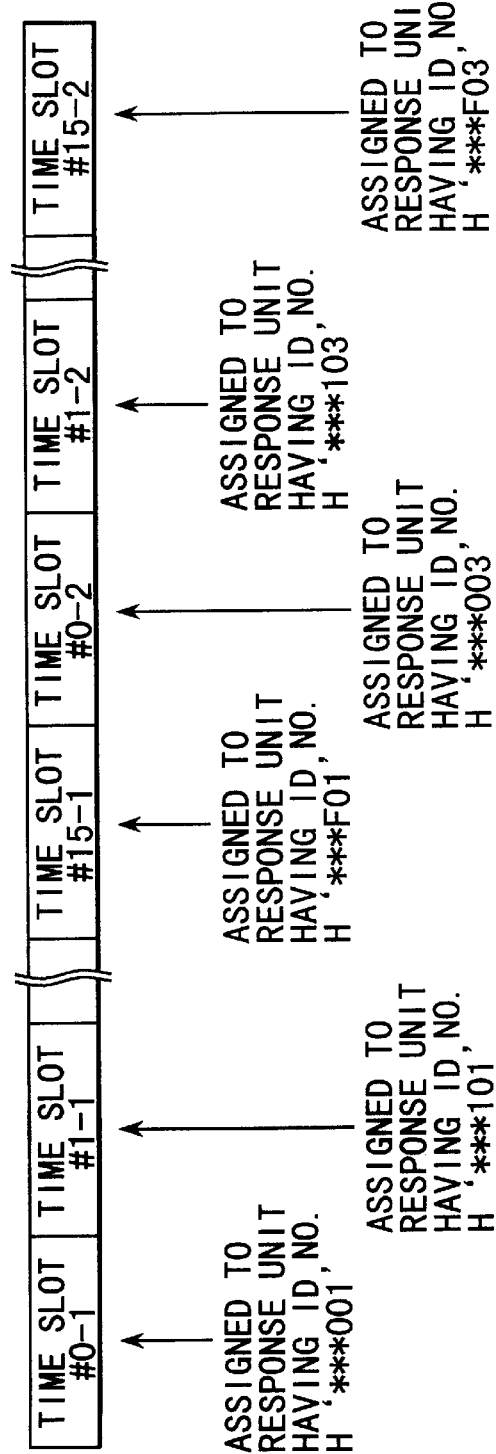
FIG. 21 is a diagram showing a specific example of the setting and assignment of time slots in the case where the address area designation information is in the state shown in FIG. 19 and two time slots have developed an error in the previous cycle.

Specifically, as shown in the state (a) of FIG. 17, the time slot of the time slot number #1 and the time slot of the time slot number #3 are assumed to have developed an error, and the remaining time slots have developed none. Then, as shown in FIG. 21, a total of 32 time slots are set, including the 16 time slots (time slot numbers #0-1, #1-1, . . . #15-1) for the response unit 2 that has transmitted the response signal in the time slot of time slot number #1 in the previous cycle and the 16 time slots (time slot numbers #0-2, #1-2, . . . , #15-2) for the response unit 2 that has transmitted the response signal in the time slot of time slot number #3 in the previous cycle. The response unit 2 that has transmitted the response signal in the time slot of time slot number #1 in the previous cycle has ID data "H'**01'. Consequently, the response units 2 are assigned time slots in such a way that the time slot of time slot number #0-1 is assigned to the response unit 2 having the ID data H'*001', the time slot of time slot number #1-1 to the response unit 2 having the ID data H'*101' and the time slot of time slot number #15-1 to the response unit 2 having the ID data H'*F01'. Also, the response unit 2 that has transmitted the response signal in the time slot of time slot number #3 in the previous cycle has the ID data H'**03'. As a result, the response units 2 are assigned the time slots in such a manner that the time slot of time slot number #0-2 is assigned to the response unit 2 having the ID data H'*003', the time slot of time slot number #1-2 is assigned to the response unit 2 having the ID data "H'*103', and the time slot of time slot number #15-2 is assigned to the response unit 2 having the ID data H'*F03'.

As described above, the number of the response units 2 assigned one time slot is reduced as compared with those in the previous cycle thereby reducing the chance of conflict. Nevertheless, the probability still remains of a single time slot being assigned to a plurality of response units 2, sometimes causing a conflict.

In view of this, the same process as in the second cycle is repeated while changing the bit position designated by the address area designation information until an error ceases to be detected for all the time slots. Once an error ceases to be detected for all the time slots as shown in the state (c) FIG. 17, the control unit control section 10 terminates the entry sequence.

In the above-mentioned entry sequence, the response unit 2 that has not received the down stream in the first cycle fails to operate in response to receipt, if any, of the down stream in the second and subsequent cycles.

As described above, upon termination of the entry sequence, the control unit control section 110 next executes the verification sequence and the entry sequence.

First, the control unit control section 110 starts the verification sequence. This verification sequence inserts the information indicating a determination request (response request) in the information elements, and controls the signal production section 14 in such a manner as to produce a down stream including the control signal having the type code of polling. Also, the control unit control section 110 inserts any one of the ID data judged in the above-mentioned entry sequence in the information elements of the control signal. The control unit control section 110 further transmits the down stream produced by the signal production section 14. The process is executed by the read data verification processing section 117.

The response unit control section 210 in the response unit 2, upon receipt of the above-mentioned down stream by way of the antenna section 24 and the demodulation section 25 and upon application thereto of the various information contained in the control signal from the signal analysis section 26, recognizes the polling mode from the type code.

In the case where the polling mode is designated in this way, the response unit control section 210 judges whether the ID data contained in the control signal is coincident with the ID data held by itself, and in the case of no-coincidence, performs no processing. In the case where the ID data contained in the control signal is coincident with that held by itself, in contrast, the response unit control section 210, upon recognition of a determination request from the information contained in the control signal, controls the signal production section 27 in such a manner as to produce a predetermined determination notification signal (a signal similar to the response signal, for example). The response unit control section 210 then causes the modulation section 28 to modulate the determination notification signal produced by the signal production section 27 and the antenna section 24 to transmit it. This process is executed by the determination notification signal transmission control section 213.

The control unit control section 110 in the control unit 1 waits for the arrival of the determination notification signal after transmission of the above-mentioned down stream. Upon receipt of the determination notification signal transmitted from any of the response signals 2 by the antenna section 16 and the demodulation section 17 and upon application of the various information contained in the determination notification signal thereto from the signal analysis section 18, then the control unit control section 110 causes the response signal determining section 118 to judge that the response unit 2 having the ID data indicated in the above-mentioned down stream exists within a predetermined read range without fail, and determines the received response signal providing a source of judgement of the particular ID data as an effective one. In the case where no determination notification signal arrives, on the other hand, it indicates that the response unit 2 having the ID data indicated in the above-mentioned down stream is not present in the predetermined read range and therefore that the particular ID data is erroneously read. Therefore, the received response signal providing the source of judgement of the particular ID data is discarded.

After that, the control unit control section 110 repeats the above-mentioned verification operation while sequentially changing the ID data indicated in the down stream for the above-mentioned determination request. Once the above-mentioned verification operation is terminated using all the ID data judged in the entry sequence, the control unit control section 110 terminates the verification sequence.

Figure 22:
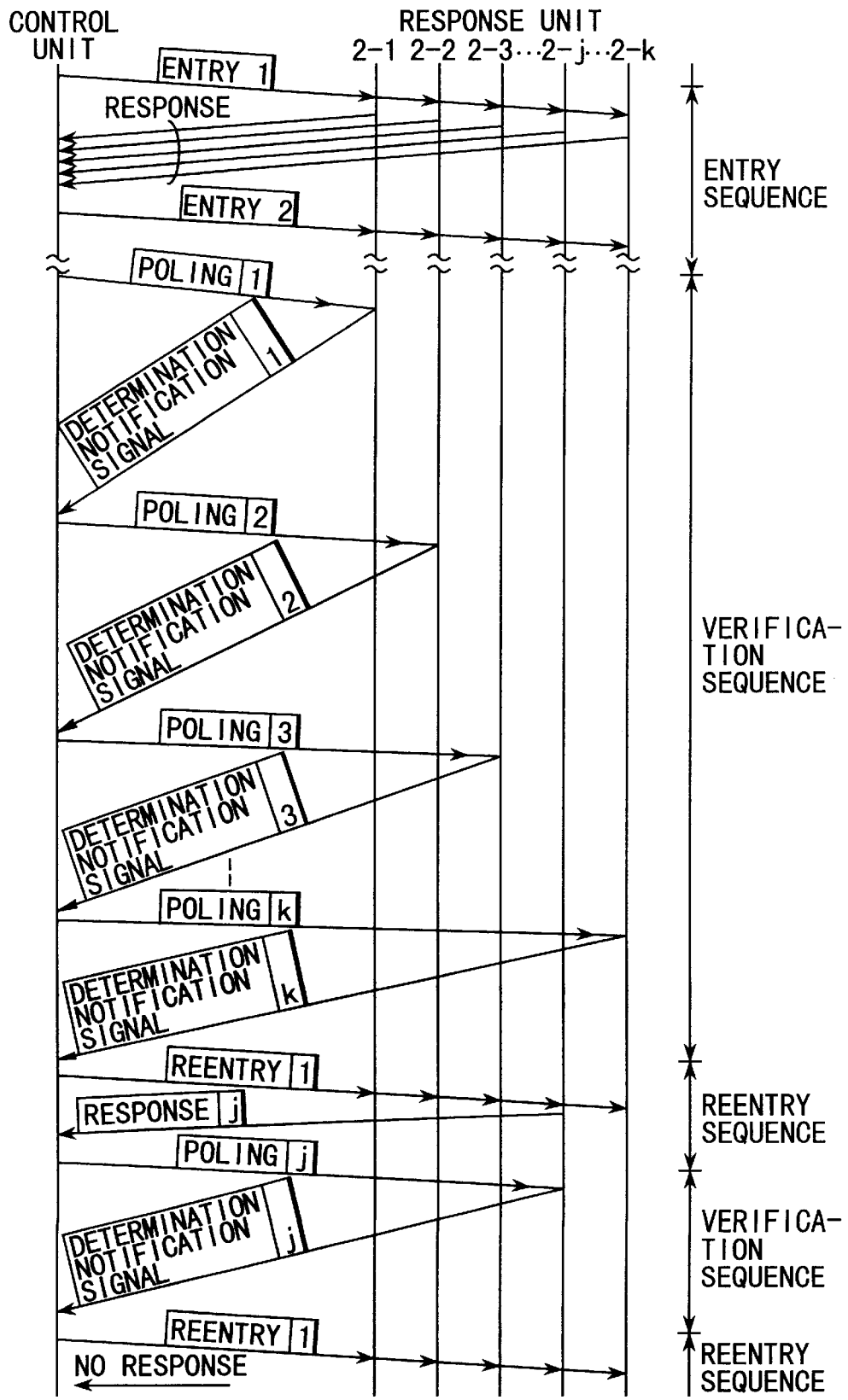
FIG. 22 is a sequence diagram showing the steps of the verification sequence and the entry sequence.

In this way, as shown in FIG. 22, the operation of the response units 2 having the ID data judged from the response signal fetched in the entry sequence is verified sequentially, and based on the result of this verification, an effective response signal is determined.

Upon termination of the above-mentioned verification sequence, the control unit control section 110 starts the reentry sequence for reading the ID data of a response unit 2 in order to check whether the particular response unit 2 yet to be read. In the first cycle of the reentry sequence, the control unit control section 110 sets the type code to "00010001" indicating the first cycle of the reentry sequence while at the same time controlling the signal production section 14 in such a manner as to produce a down stream including the control signal with the address area designation information inserted in the information elements. The control unit control section 110 then causes the down stream produced by the signal production section 14 to be modulated by the modulation section 15 and transmitted by the antenna section 16. The control signal in the down stream thus produced is equivalent to the control signal of FIG. 13, for example, with the type code thereof changed to "00010001". In the reentry sequence, however, the responding response units 2 are limited to those not yet read, and the number of them is expected to be very few. The number of "1" in the address area designation information, therefore, can be reduced to set a smaller number of time slots. This process is executed by the reentry instruction information transmission control section 119.

The response unit control section 210 in the response unit 2, upon receipt of the above-mentioned down stream by way of the antenna section 24 and the demodulation section 25 and upon application thereto of the various information contained in the control signal from the signal analysis section 26, recognizes the first cycle of the reentry sequence from the type code. In the process, the response unit control section 210 performs the following-described operation only in the case where the down stream indicating the ID signal held in the response unit 2 associated with it has failed to arrive, i.e. only in the case where the verification operation for the response unit 2 associated with it has not been performed in the verification sequence.

The response unit control section 210 judges the time slot assigned to the response unit 2 associated with it in the same manner as in the case of entry sequence, based on the address area instruction information. The control unit control section 210 then recovers the required unique information from the unique information storage section 29, and controls the signal production section 27 in such a manner as to produce the response signal containing the particular unique information as in the case of entry sequence. The response unit control section 210 causes the response signal produced by the signal production section 27 to be modulated by the modulation section 28 and transmitted by way of the antenna section 24 at the timing of the time slot judged as described above. This process is executed by the reentry information transmission control section 214.

Specifically, as shown in FIG. 22, for example, the verification operation for the response unit 2-*j* is not performed in the verification sequence. The response unit 2-*j*, therefore, transmits the response signal.

The control unit control section 110 in the control unit 1, upon arrival of the response signal as described above, judges the ID data of the response unit 2 that has transmitted the particular response signal in the same way as in the entry sequence. The control unit control section 110 then executes the verification sequence again in order to verify the response unit 2 having the ID data judged. Upon arrival of the determination notification signal, the received response signal providing the source of judging the ID data described above is additionally determined as effective.

Further, the control unit control section 110 causes the entry sequence control section 121 to repeat the reentry sequence and the verification sequence as described above until the response signal ceases to be transmitted from the response signal not yet read.

In the case where a conflict between the response signals occurs in the reentry sequence, the control unit control section 110 causes the entry error information re-acquisition processing section 120 to execute the process in the second and subsequent cycles of the reentry sequence in the same manner as the process in the second and subsequent cycles of the entry sequence. In such a case, the response unit control section 210 of the response unit 2 that has transmitted the response signal in the previous cycle executes the same process as in the second and subsequent cycles of the entry sequence by way of the reentry error information retransmission control section 215.

In the above-mentioned reentry sequence, the response unit 2 that has not received the down stream in the first cycle performs no operation in response to receipt, if any, of the down stream in the second and subsequent cycles.

As described above, according to this embodiment, in the case where unique information is read from the response unit 2 of which the ID data is known, transmission of a down stream indicating all the ID data makes it possible to transmit the response signal only to a specified response unit 2, thereby positively avoiding the conflict between the response signals.

In the case where the unique information of a given response unit 2 existing in a predetermined read range is read, in contrast, the control unit 1 sets a plurality of time slots, and the response unit 2 transmits the response signal using a time slot determined in accordance with the state of a part of the ID data associated with itself. Consequently, even in the case where a plurality of response units 2 exist in the read range, the transmission timing of the response signals of the response units 2 is randomized thereby reducing the probability of conflicts.

Should a conflict occur even after that, the control unit 1 newly sets a plurality of time slots in the next cycle corresponding to the time slot in which the conflict has occurred, and the response unit 2 that has transmitted the response signal using the particular time slot transmits a response signal using a time slot determined in accordance with the state of a part (a part different from that in the previous case) of the ID data associated with itself. As a result, the retransmission timings of the response signal are randomized between the response units 2 of which the transmission timings are overlapped, thereby reducing the probability of conflicts.

In the above-described manner, the transmission timing of the response signals of the response units 2 is randomized efficiently and thus endless repetition of conflicts is avoided. In addition, even in the case where some conflicts occur as described above, the transmission timing can be displaced efficiently in the next cycle, and therefore the waiting time of each response unit 2 can be minimized. As a result, the unique information of a given response unit 2 existing in a predetermined read range can be efficiently read within a short time.

According to this embodiment, taking advantage of the fact that a time slot corresponds to a part of the ID data, the ID data in the state other than the part corresponding to the time slot is indicated in a response signal. Therefore, compared with the case where all the ID data are indicated in the response signal, the size of each slot size can be reduced, thereby shortening the time of each cycle. As a result, the time required for a series of read operations can be reduced.

Also, according to this embodiment, the verification sequence and the reentry sequence are executed after complete reading by the entry sequence so that the unique information of the response units 2 not yet read in the entry sequence are read, thereby improving the reliability considerably.

(Second embodiment)

A general configuration of an information ID system according to this embodiment is shown in FIG. 1 as in the first embodiment. The hardware configuration of the control unit 1 and the response units 2 is also shown in FIGS. 2 and 4, respectively, as in the first embodiment.

The present embodiment is different from the first embodiment, however, in the operation program for the CPU 10 stored in the ROM 11 and the operation program for the CPU 21 stored in the ROM 22. As a result, the CPU 10, the ROM 11 and the RAM 12 constitute a control unit control section 310 shown in FIG. 23 different from the control unit control section 110 in the first embodiment. Also, the CPU 21, the ROM 22 and the RAM 23 constitute a response unit control section 410 shown in FIG. 24 different from the response unit control section 210 in the first embodiment.

Figure 23:
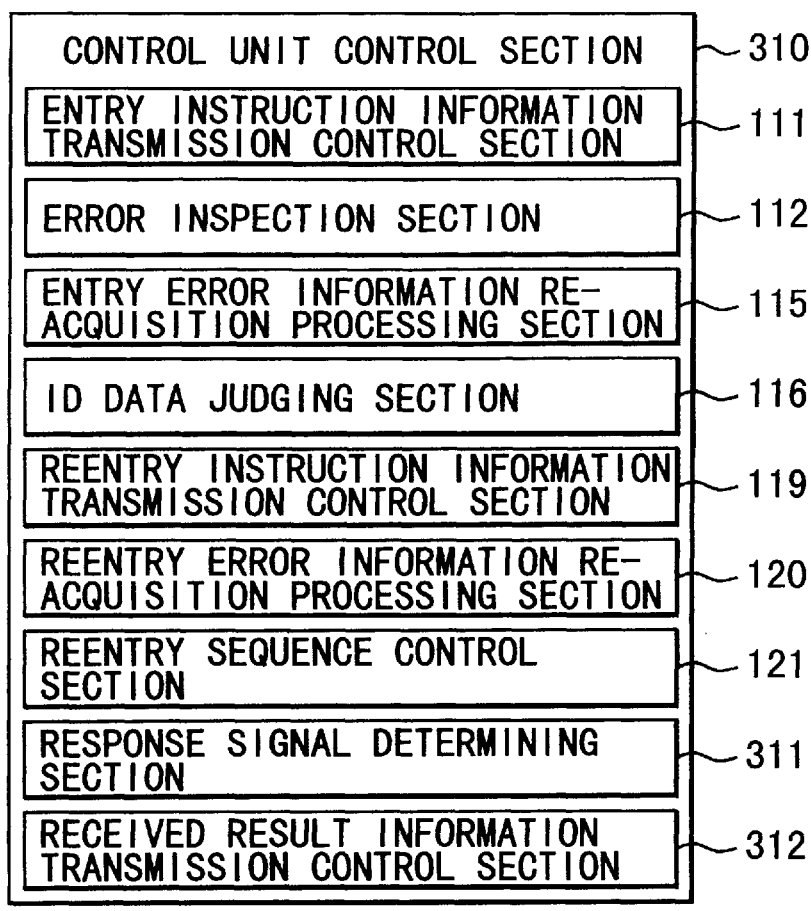
FIG. 23 is a diagram showing a configuration of the control unit control section including the CPU 10, the ROM 11 and the RAM 12 in FIG. 2 according to the second embodiment.

As shown in FIG. 23, the control unit control section 310 includes an entry instruction information transmission control section 111, an error inspection section 112, an entry error information re-acquisition processing section 115, an ID data judging section 116, a reentry instruction information transmission control section 119, a reentry error information re-acquisition processing section 120, a reentry sequence control section 121, a response signal determining section 311 and a received result information transmission control section 312.

The response signal determining section 311 determines and fetches, as an effective response signal, only a response signal judged by the error inspection section 112 to have no error and discards response signals having an error.

The received result information transmission control section 312 controls the production and transmission of a down stream including the received result information representing the error presence-absence information indicating whether a response signal arriving in each of a plurality of time slots set in one cycle described later and the ID data judged from a response signal arriving in a time slot having no error.

Figure 24:
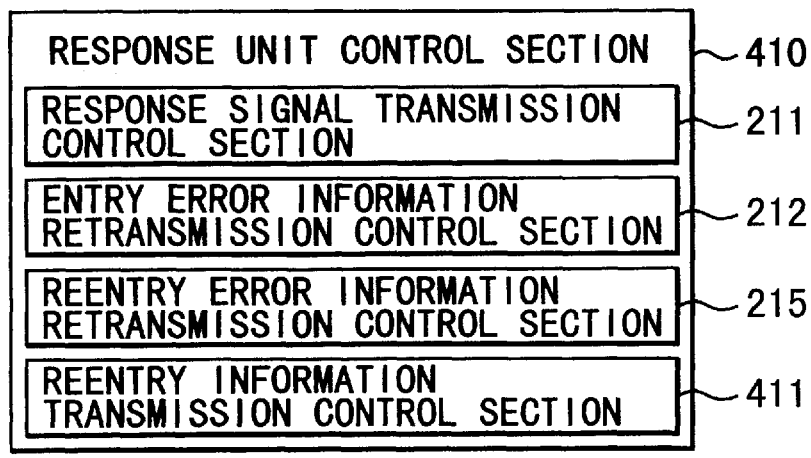
FIG. 24 is a diagram showing a configuration of the response unit control section 210 including the CPU 21, the ROM 22 and the RAM 23 in FIG. 4 according to the second embodiment.

As shown in FIG. 24, the response unit control section 410 includes a response signal transmission control section 211, an entry error information retransmission control section 212, a reentry error information retransmission control section 215 and a reentry information transmission control section 411.

The reentry information transmission control section 411 controls the transmission of a response signal in the reentry sequence, in the case where in spite of the fact that a response signal is sent out in the entry sequence and in spite of the judgement that the received result information in the time slot used for sending out the particular response signal is free of error, the ID data indicated in the received result information for the particular time slot is different from the ID data of the response signal held in the entry information transmission control section 411.

Now, an explanation will be given of the operation of the information ID system configured as described above.

According to this embodiment, as in the above-mentioned embodiments, individual unique information can be read from or written from and into the response unit 2 of which the ID data is known, in the same way as in the first embodiment.

Also, the unique information of an arbitrary response unit 2 existing in a predetermined read range is read by the control unit 1 in the entry sequence in the same manner as in the first embodiment. According to the present embodiment, however, in the entry sequence, a response signal free of error is determined and fetched directly as an effective signal while at the same time acknowledging the returning of the ID data.

Specifically, the control unit control section 310 causes the response signal determining section 311 to immediately determine, as an effective signal, the response signal that the error inspection section 112 has judged to have no error.

Figure 25:
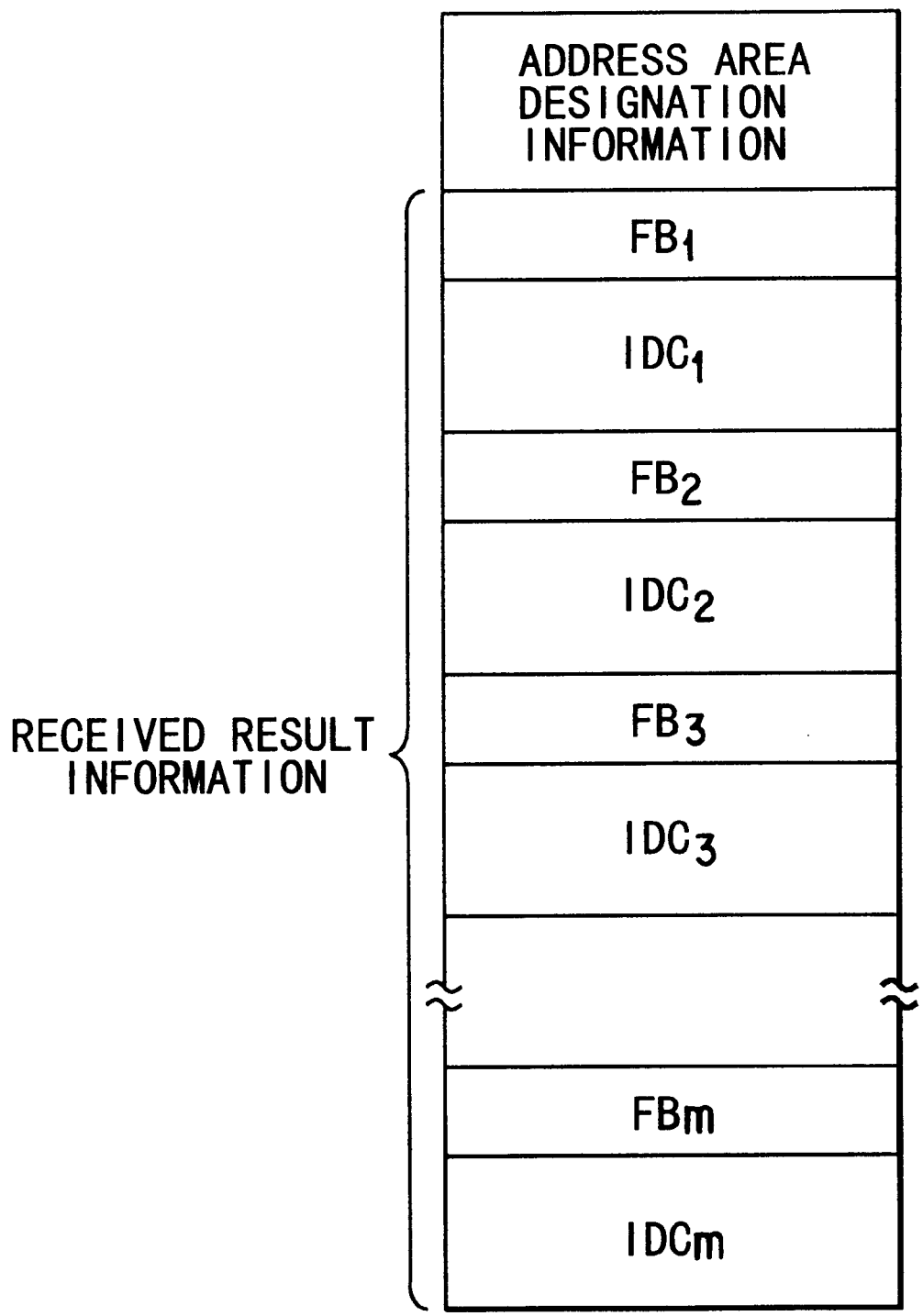
FIG. 25 is a diagram showing a format of the information elements in the control signal in the second and subsequent cycles of the entry sequence.

The control unit control section 310 causes the down stream transmitted in the second and subsequent cycles in the entry sequence to include a control signal having information elements indicating the received result information in place of the error presence-absence information in the first embodiment as shown in FIG. 25.

The received result information includes, for each time slot set in the previous cycle (first cycle in the case under consideration), flag bits ($FB_1$ to $FB_m$) indicating the result of judgement whether a response signal has an error and the received ID data notification information ($IDC_1$ to $IDC_m$) inserted behind the flag bits for indicating the ID data judged from the response signal arriving in each time slot. The received ID data notification information indicates only the time slots free of error, and the time slots that developed an error are indicated by flag bits alone.

In the case where a response signal is transmitted, the response unit control section 410 in the response unit 2 monitors the received result information in a down stream in the next cycle and judges from the corresponding flag bit whether an error has developed in the time slot used for transmission of the response signal. Unless an error has developed in the time slot used for transmission of the response signal, the response signal is not sent out by the response unit control section 210 during the subsequent entry sequence period. In the presence of an error, on the other hand, the response signal is retransmitted.

The processing in the response unit control section 410 is similar to that in the response unit control section 210 in the first embodiment. In the case where the time slot used for transmission of a response signal has no error, however, the response unit control section 410 causes the reentry information transmission section 411 to judge whether the ID data indicated in the received ID data notification information is the ID data for the response unit control section 410, and holds the result in the RAM 23.

Figure 26:
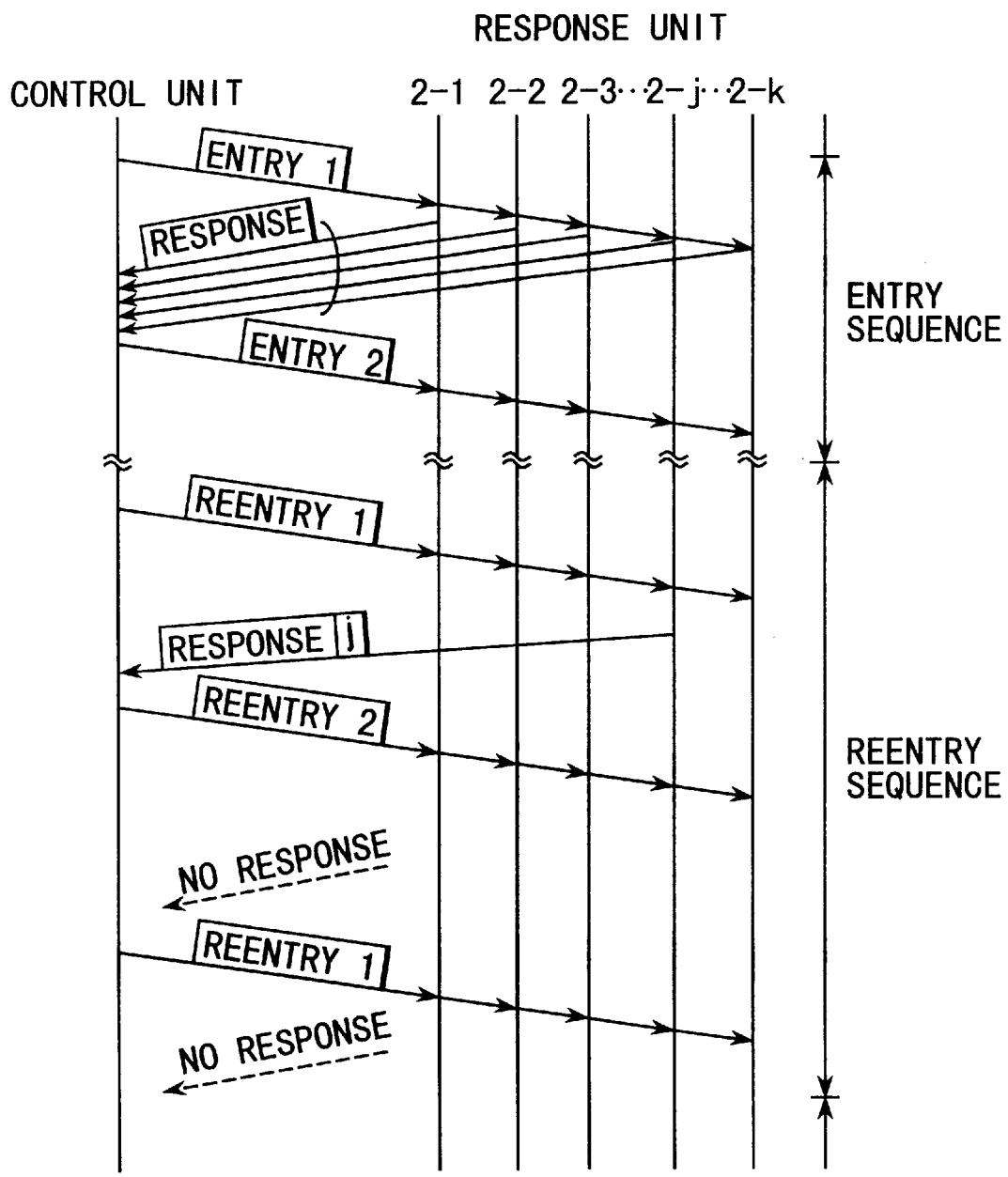
FIG. 26 is a sequence diagram showing the steps of a reentry sequence.

For the control unit control section 310 in the control unit 1, on the other hand, assume that the entry sequence has been completed. As shown in FIG. 26, the verification sequence is not executed. Instead, the control unit control section 310 immediately starts and executes the reentry sequence in the same manner as in the first embodiment.

The operation of the control unit control section 310 and the response unit control section 410 in the reentry sequence is substantially the same as that of the control unit control section 110 and the response unit control section 210, respectively, in the first embodiment. The response unit control section 410 in the response unit 2 is different, however, in that upon entry of the reentry sequence, it transmits a response signal in the case where an error has not occurred in the time slot used for transmission of the response signal in the entry sequence and in the case where the ID data indicated in the received ID data notification information corresponding to the particular time slot is different from the ID data held in the response unit control section 410.

As described above, the present embodiment can attain a similar effect to that of the first embodiment.

Also, according to this embodiment, the control unit 1 notifies the ID data read thereby to the response unit 2 in the entry sequence, and the response unit 2 transmits a response signal in the reentry sequence, in the case where the time slot used for transmission of the response signal has no error and in the case where the ID data indicated in the received ID data notification information corresponding to the particular time slot is different from the ID data held in the control unit 2. As a result, the verification sequence is not required, thereby making it possible to perform the read operation within a shorter time.

(Third embodiment)

A general configuration of an information ID system according to this embodiment is shown in FIG. 1 as that of the first embodiment. Also, the hardware configuration of the control unit 1 and the response unit 2 is shown in FIGS. 2 and 4, respectively, as those of the first embodiment.

According to this embodiment, however, the operation program for the CPU 10 stored in the ROM 11 and the operation program for the CPU 21 stored in the ROM 22 are different from the corresponding ones of the first embodiment. Consequently, the CPU 10, the ROM 11 and the RAM 12 constitute a control unit control section 510 shown in FIG. 27 which is different from the control unit control section 110 of the first embodiment. Also, the CPU 21, the ROM 22 and the RAM 23 constitute a response unit control section 610 shown in FIG. 28 which is different from the response unit control section 210 in the first embodiment.

Figure 27:
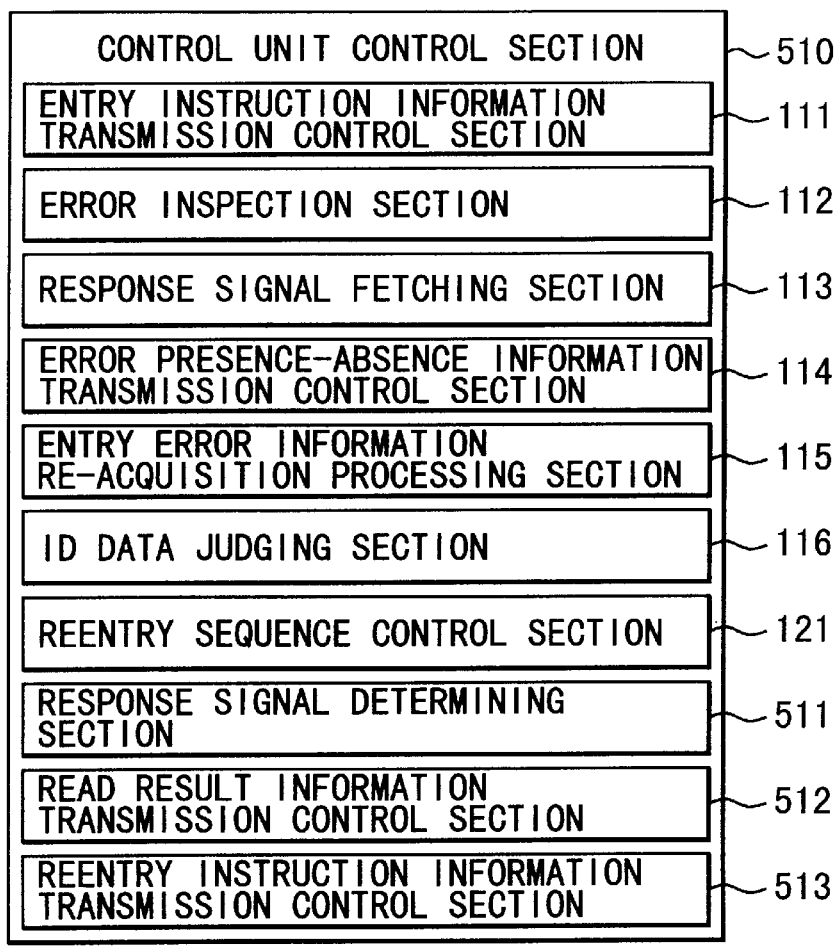
FIG. 27 is a diagram showing a configuration of the control unit control section including the CPU 10, the ROM 11 and the RAM 12 in FIG. 2 according to a third embodiment.

As shown in FIG. 27, the control unit control section 510 includes an entry instruction information transmission control section 111, an error inspection section 112, a response signal fetching section 113, an error presence-absence information transmission control section 114, an entry error information re-acquisition processing section 115, an ID data judging section 116, a reentry sequence control section 121, a response signal determining section 511, read result information transmission control section 512 and a reentry instruction information transmission control section 513.

The response signal determining section 511 determines and fetches, as an effective response signal, only those response signals which have been judged to have no error by the error inspection section 112, and discards response signals having an error.

The read result information transmission control section 512 controls the production and transmission of a down stream including the read result information indicating the ID data judged by the ID data judging section 116 in the entry sequence.

The reentry instruction information transmission control section 513 controls the production and transmission of a down stream including the reentry instruction information for requesting the transmission of a response signal from the response unit 2 in the reentry sequence described later.

Figure 28:
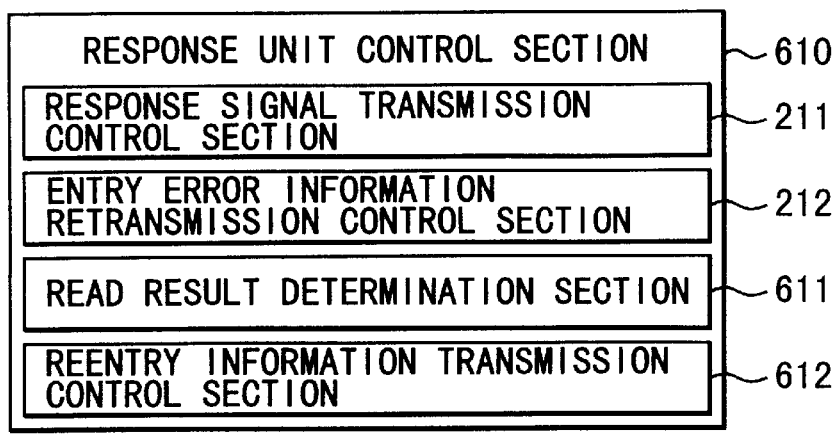
FIG. 28 is a diagram showing a configuration of the response unit control section including the CPU 21, the ROM 22 and the RAM 23 in FIG. 4 according to the third embodiment.

As shown in FIG. 28, the response unit control section 610 includes a response signal transmission control section 211, an entry error information retransmission control section 212, a read result determination section 611 and a reentry error information transmission control section 612.

In the case where the response signal transmission control section 211 transmits a response signal in the entry sequence, the read result determination section 611 determinates the read result in the control unit 1 of the response signal transmitted in the entry sequence based on the read result notification information arriving in a down stream after completion of the entry sequence.

The reentry error information transmission control unit 613 controls the transmission of a response signal in the reentry sequence only in the case where the response signal transmitted by the control unit 613 by way of the read result determination section 611 is judged not to have been received by the control unit 1.

Now, an explanation will be given of the operation of an information ID system having the configuration as described above.

According to this embodiment, as in the preceding embodiments, the operation of reading or writing individual unique information from and into the response unit 2 of which the ID data is known can be performed in the same manner as in the first embodiment.

Also, when the control unit 1 reads the unique information of a given response unit 2 existing in a predetermined read range, the entry sequence is executed in the same manner as in the first embodiment. In the entry sequence, however, according to this embodiment, a response signal free of error is determined and fetched directly as an effective response signal.

Specifically, the control unit control section 510 immediately causes the response signal determining section 511 to determine, as an effective response signal, any response signal that has been judged by the error inspection section 112 to have no error.

Figure 29:
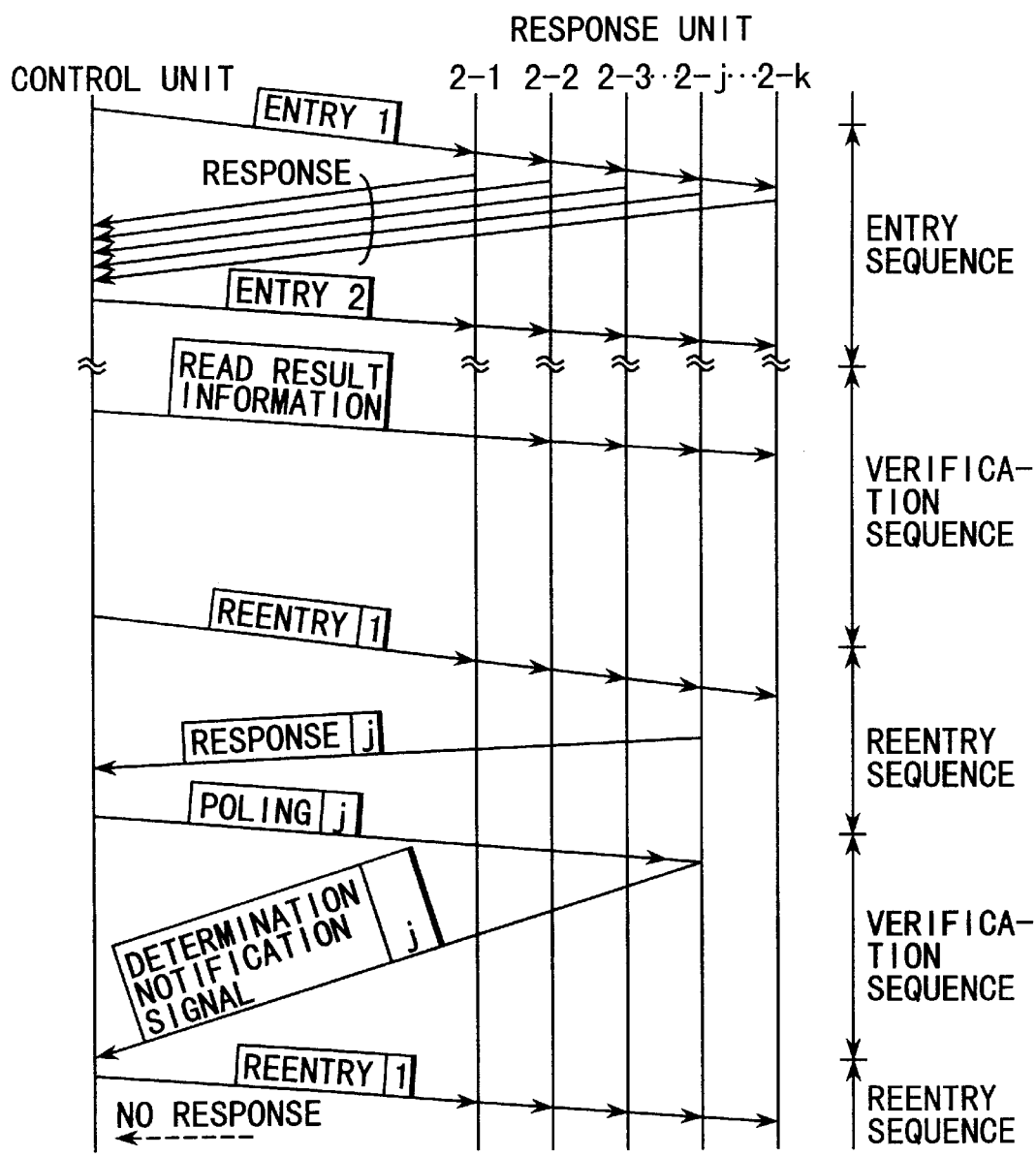
FIG. 29 is a sequence diagram showing the steps of the verification sequence and the reentry sequence.

Upon complete entry sequence, the control unit control section 510 performs the verification sequence and the reentry sequence as shown in FIG. 29.

The control unit control section 510 starts with the verification sequence. In the verification sequence, the control unit control section 510 controls the signal production section 14 in such a manner as to produce a down stream including the read result information indicating each ID data determined by the response signal determining section 511 in the entry sequence. The control unit control section 510 causes the down stream produced by the signal production unit 14 to be modulated by the modulation section 15 and transmitted by the antenna section 16.

The read result information is basically the result of arranging the determined ID data randomly.

In the first and second embodiments, the ID data is defined as a 3-byte binary data item for simplicity's sake. Actually, however, a binary data item of larger size is often used. For example, the 8-byte ID data item is sometimes used as shown in FIG. 30.

In the case where the ID data of such a large size is used, simple random arrangement of the ID data in the production of the read result information may undesirably increase the data size of the read result information excessively. An excessively large size of the read result information would require a longer time for transmission thereof, resulting in an increased time before complete read operation.

In view of this, the control unit control section 510 compares the various ID data with each other, and if there are a plurality of ID data having the same state of a bit string of a part of bytes, those ID data are collected into a group. For this group, the read result information in a format as shown in FIG. 31 is produced.

This read result information includes a type code, a common byte position designation information, one common byte value, a plurality of individual byte values, and error detection code (CRC) for each of the common byte value and the individual byte value.

The type code is a predetermined one indicating an acknowledge sequence and a notification that the ID data is divided into a common byte value and an individual byte value.

The common byte position designation information is an 8-bit binary data item. In the common byte position designation information, each bit corresponds to each byte. The information indicates that the value of the byte corresponding to a bit "1" constitutes a common byte value.

The common byte value indicates the same byte value for all the ID data in a group.

The individual byte value indicates the byte value other than the common byte different between different ID data in a group.

Specifically, once the ID data as shown in FIG. 32 is determined, the read result information as shown in FIG. 33 is produced. In other words, the ID data H'1A2B3C4D56789ABC', the ID data H'1A2B3C4D6789ABCD' and the ID data H'1A2B3C4D789ABCDE' are determined. In such a case, the fifth to eighth bytes are the same H'1A2B3C4D'. Thus, the fifth to eighth bytes are defined as a common byte position. The common byte position designation information, as shown in FIG. 33, is defined as B'1111000' with the four high-order bits of "1" corresponding to the fifth to eighth bytes. The common byte value is defined as H'1A2B3C4D'. Further, the individual byte values are defined as H'56789ABC', H'6789ABCD' and H'789ABCDE'.

Once the ID data is determined as shown in FIG. 34, the read result information as shown in FIG. 35 is produced in addition to the read result information shown in FIG. 33. Specifically, the ID data determined include H'1A2B3C4D56789ABC',H'1A2B3C4D6789ABCD', H'1A2B3C4D789ABCDE',H'ABCDEF1234000000', H'ABCDEF1234111111' and H'ABCDEF1234222222'. In this case, the fifth to eighth bytes of the first three ID data are the same and H'1A2B3C4D', and the fourth to eighth bytes of the last three ID data are the same ABCDEF1234. Thus, the first three ID data are defined as the first group, or the last three ID data is defined as the second group. For the first group, the above-mentioned read result information shown in FIG. 33 is produced. For the second group, on the other hand, the read result information as shown in FIG. 35 is produced.

Figure 36:
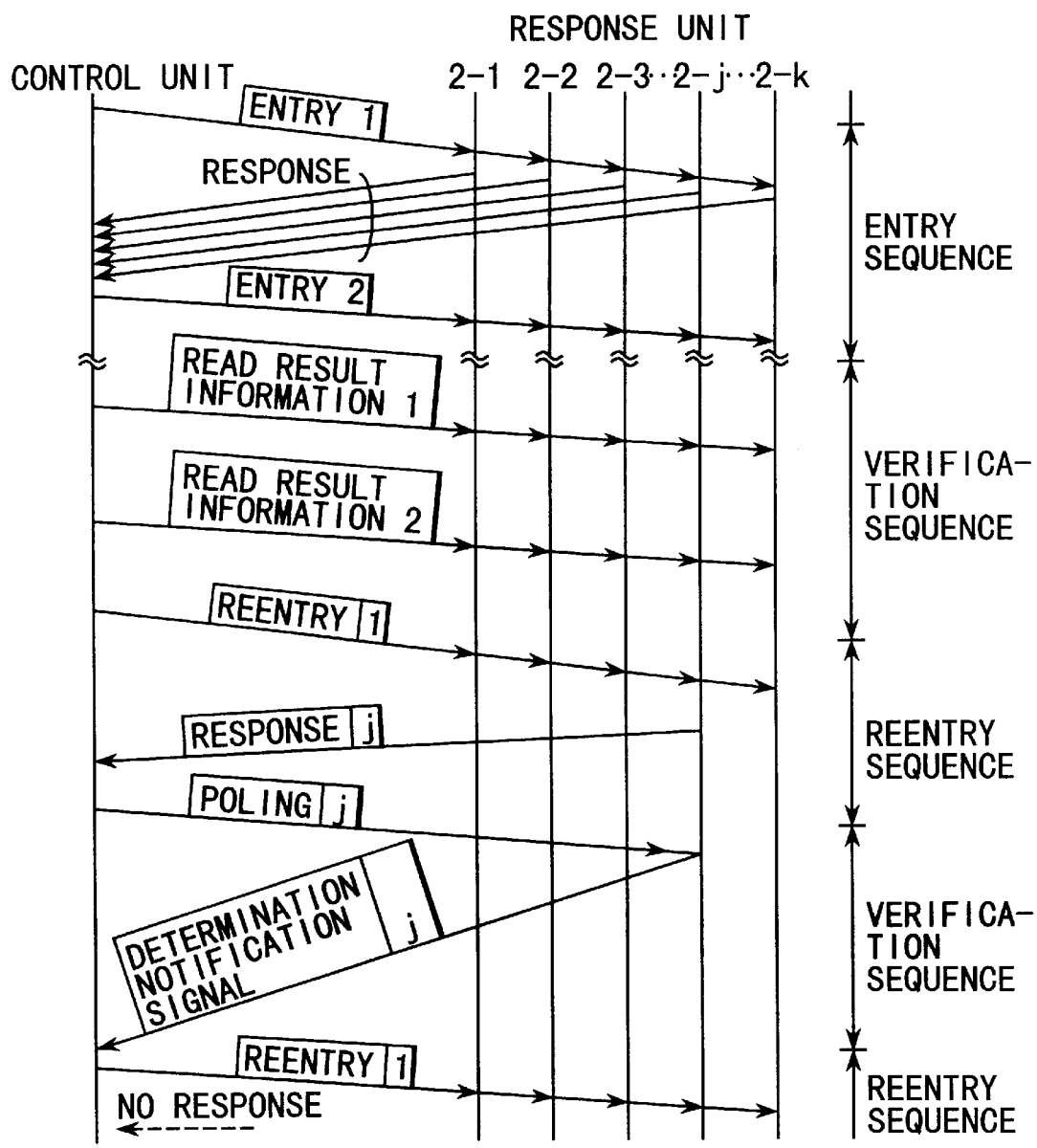
FIG. 36 is a sequence diagram showing the steps of the verification sequence and the reentry sequence.

These two read result information items thus produced are transmitted sequentially as shown in FIG. 36.

In the case where a response signal is transmitted in the entry sequence, the response unit control section 610 in the response unit 2 monitors the read result information in the down stream in the verification sequence. The response unit control section 610 then compares the various ID data indicated in the read result information with the ID data of itself, and judges whether the ID data of itself is indicated in the read result information. In the case where the ID data in the read result information is divided in the way mentioned above, the response unit control section 610 reproduces the ID data by combining the individual byte values with the common byte value and compares the resulting ID data with the ID data of itself. The response unit control section 610 stores the result of this judgement in the RAM 23. The read result determinating process described above is executed by the read result acknowledge means 611.

The response unit control section 610 only performs the above-mentioned read result acknowledge process in the verification sequence but transmits no up stream.

In view of this, the control unit control section 510 in the control unit 1 terminates the verification sequence and transfers to the reentry sequence upon complete transmission of the down stream including the read result information. Specifically, the control unit control section 510 starts the reentry sequence by way of the reentry instruction information transmission control section 513 upon complete transmission of the down stream including the read result information.

The operation of the control unit control section 510 and the response unit control section 610 in the reentry sequence is similar to that of the control unit control section 110 and the response unit control section 210 in the first embodiment. The difference lies, however, in the manner in which the timing is taken differently from the first embodiment for starting the reentry sequence by the reentry instruction information transmission section 513 of the control unit control section 510. Another difference from the first embodiment is that the response signal is transmitted by the reentry information transmission control section 612 of the response unit control section 2 only in the case where it judged by the read result vertifiment in the verification sequence that the ID data of itself is not indicated in the read result information.

As described above, according to the present embodiment, a similar effect to the first embodiment is achieved.

Also according to this embodiment, in the verification sequence, the ID data read by the control unit 1 is broadcast to the response units 2 so that each response unit 2 is caused to recognize the ID data read by the control unit 1. The response signal from the response unit 2 is not transmitted in the verification sequence. Consequently, the time which otherwise would be required for transmission of the response signal can be saved for a shortened time for the verification sequence.

Further, according to this embodiment, in the verification sequence, the ID data read by the control unit 1 is divided into groups each having the same state of a part of a byte. Only one common byte is transmitted for each group, and the remaining parts of the byte of each ID data are individually transmitted as individual information. As a result, the size of the information transmitted in the down stream in the verification sequence can be reduced as compared with the case where all the parts of the ID data are included. Thus, the time required for transmission of the down stream can be reduced, thereby shortening the time required for the verification sequence.

(Fourth embodiment)

A general configuration of an information ID system according to this embodiment is similar to that of the first embodiment shown in FIG. 1. Also, the hardware configuration of the control unit 1 and the response units 2 is similar to that of the first embodiment shown in FIGS. 2 and 4, respectively.

The present embodiment, however, is different from the first embodiment in the operation program for the CPU 10 stored in the ROM 11 and the operation program for the CPU 21 stored in the ROM 22. As a result, the CPU 10, the ROM 11 and the RAM 12 constitute a control unit control section 710 as shown in FIG. 37 which is different from the control unit control section 110 in the first embodiment.

Figure 37:
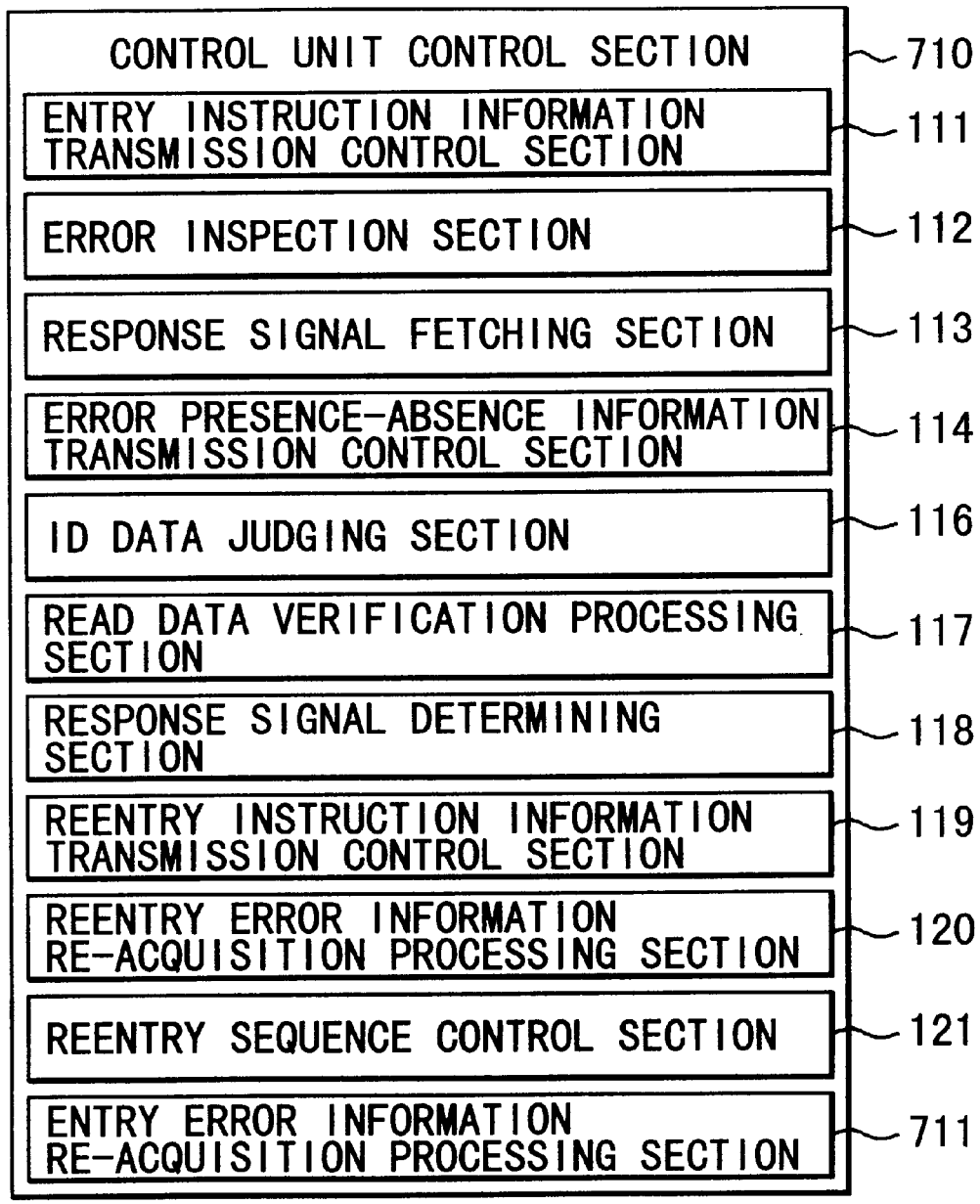
FIG. 37 is a diagram showing a configuration of the control unit control section including the CPU 10, the ROM 11 and the RAM 12 in FIG. 2 according to a fourth embodiment.

As shown in FIG. 37, the control unit control section 710 includes an entry instruction information transmission control section 111, an error inspection section 112, a response signal fetching section 113, an error presence-absence information transmission control section 114, an ID data judging section 116, a read data verification processing section 117, a response signal determining section 118, a reentry instruction information transmission control section 119, a reentry error information re-acquisition processing section 120, a reentry sequence control section 121 and an entry error information re-acquisition processing section 711.

Specifically, the control unit control section 710 according to this embodiment includes the entry error information re-acquisition processing section 711 instead of the entry error information re-acquisition processing section 115 in the first embodiment.

The entry error information re-acquisition processing section 711, like the entry error information re-acquisition processing section 115 in the first embodiment described above, executes, in the latest cycle, the process for acquiring the response signal transmitted from the response unit 2 in a time slot (hereinafter referred to as the error slot) that has developed an error in the previous cycle of the entry sequence. The entry error information re-acquisition processing section 711 according to this embodiment, however, regulates the total number of time slots (hereinafter referred to as the new slots) set in the latest cycle not to exceed the limitation determined in each system.

Specifically, according to this embodiment, in the case where the maximum number of time slots capable of being set in a cycle is limited by the need of maintaining synchronism or other situations, the total number of time slots set in a cycle is regulated in such a manner as not to exceed the limited maximum number.

Now, an explanation will be given of the operation of the information ID system having the configuration mentioned above. The substantially whole operation is similar to that of the first embodiment and will not be described, excepting the process for limiting the number of time slots executed by the control unit control section 710 by way of the entry error information re-acquisition processing section 711. For facilitating the understanding, it is assumed that four time slots are set as a standard for each error slot in the latest cycle and that the number is limited to 16.

Figure 38:
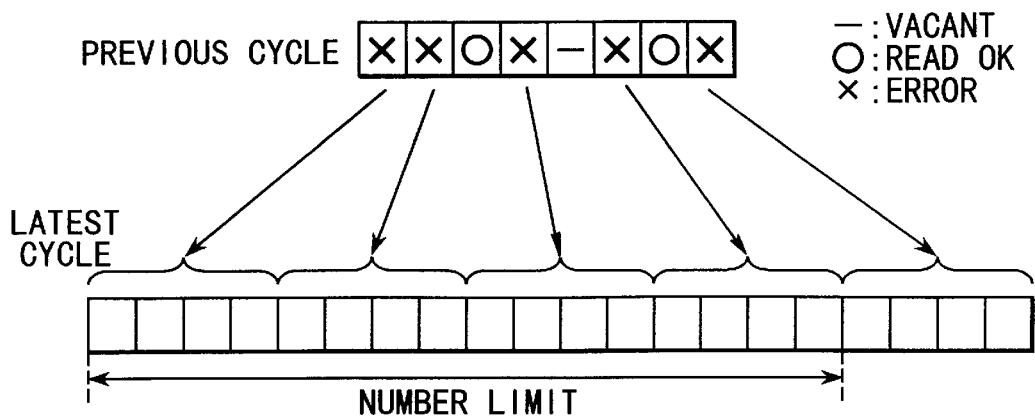
FIG. 38 is a diagram showing the manner in which the total number of the time slots set in a cycle exceeds a limit.

Suppose five time slots have developed an error as shown in FIG. 38 in the previous cycle. Then, if a standard number of new slots is set for each of the five error slots in the latest cycle, the total number of new slots is 20 (=5×4) which exceeds the limitation.

In view of this, the control unit control section 710 monitors the product of the number of error slots and the standard number of new slots assigned to each of the error slots. In the case where the product value exceeds the limitation, the number of bits "1" is reduced in the address area designation information produced for the latest cycle until the product of the number of error slots and the number of new slots assigned to each error slot is reduced below the limitation.

Figure 39:
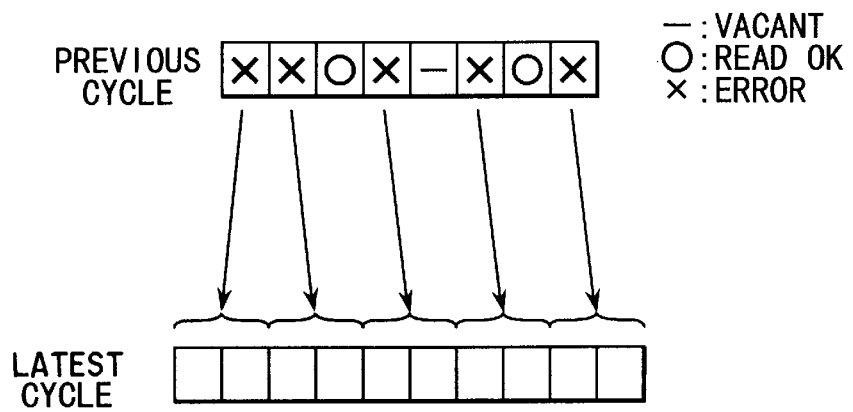
FIG. 39 is a diagram showing a first example of the manner in which time slots are assigned so that the total number of the time slots set in a cycle does not exceed a limit.

Specifically, assuming that the standard number is 4, the number of bits "1" is 2 in the address area designation information. This number of bits is changed to 1. As a result, in the latest cycle, as shown in FIG. 39, two new slots can be assigned to each error slot. Then, the total number of new slots is 10 which is less than the limitation.

In this way, according to this invention, the number of time slots per cycle is prevented from exceeding the maximum number.

In the case where the number of new slots assigned to error slots is reduced as described above, conflicts may be repeated. Once such a situation has developed, the number of cycles in the entry sequence would increase, consuming a large amount of time.

Now, an explanation will be given of a modification in which the number of new slots assigned to error time slots is not reduced.

The control unit control section 710 monitors the product of the number of error slots and the standard number of new slots assigned to each error slot. In the case where the product exceeds a limitation, the control unit control section 710 divides the limitation by the standard number and separates the error slots into groups each having the number of error slots equal to the quotient.

Specifically, since the limitation is 16 and the standard number 4, the quotient obtained by dividing the limitation by the standard number is 4. Four of the five error slots, therefore, are defined as a first group and the remaining one is defined as a second group.

Figure 40:
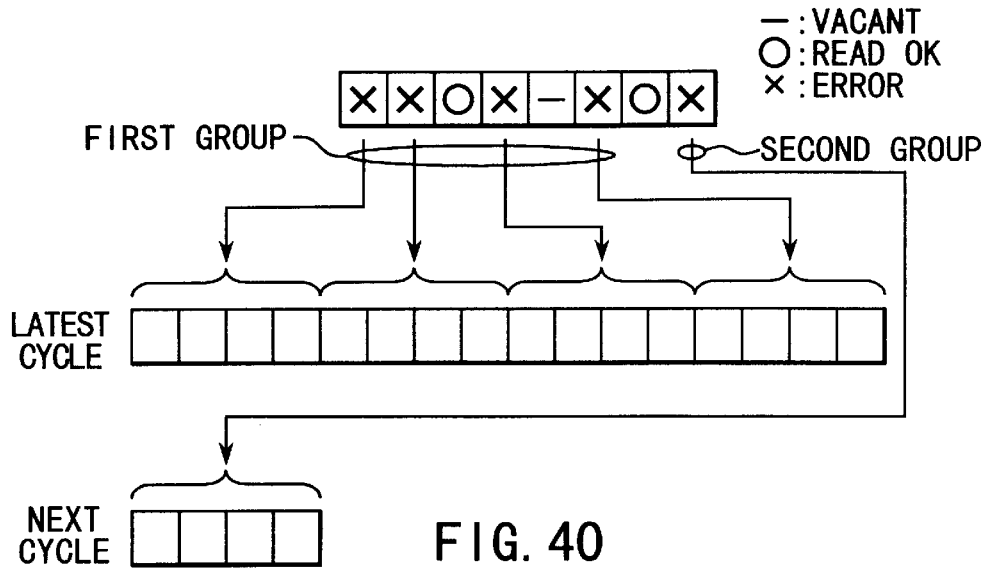
FIG. 40 is a diagram showing a second example of the manner in which time slots are assigned so that the total number of the time slots set in a cycle does not exceed a limit.
Figure 41:
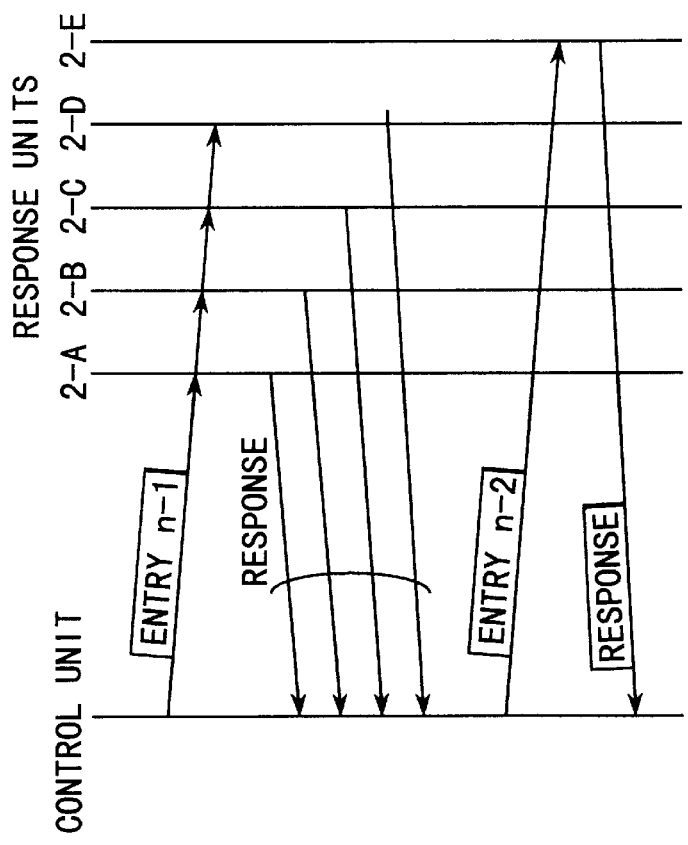
FIG. 41 is a sequence diagram showing the steps of the verification sequence in the case where time slots are assigned as shown in FIG. 40.

Then the control unit control section 710, as shown in FIG. 40, assigns four new slots to each of the four error slots of the first group in the latest cycle. A down stream including a control signal indicating the assignment is produced, and transmitted as a first one of n entry instructions (entry n−1) as shown in FIG. 41. The control signal is configured, for example, in such a manner that the information indicating the error slots involved is added to the control signal shown in FIG. 12, for example.

The first of the n entry instructions is aimed at the four response units 2-A to 2-D that have responded with the four error slots constituting the first group. Therefore, the responses from these response units 2-A to 2-D are returned to the control unit 1.

Upon receipt of these responses, the control unit control section 710, as soon as the timing for the next cycle arrives, transmits the second of the n entry instructions (entry n−2) as shown in FIG. 41. This instruction is aimed at the response unit group 2-E constituting the second group that has responded with one error slot. Thus, the response from the response unit group 2-E is returned to the control unit 1.

According to this modification, the first entry is executed using a plurality of cycles, so that the number of time slots per cycle can be prevented from exceeding the maximum number while at the same time making it possible to assign the standard number of new slots to each error slot.

Figure 42:
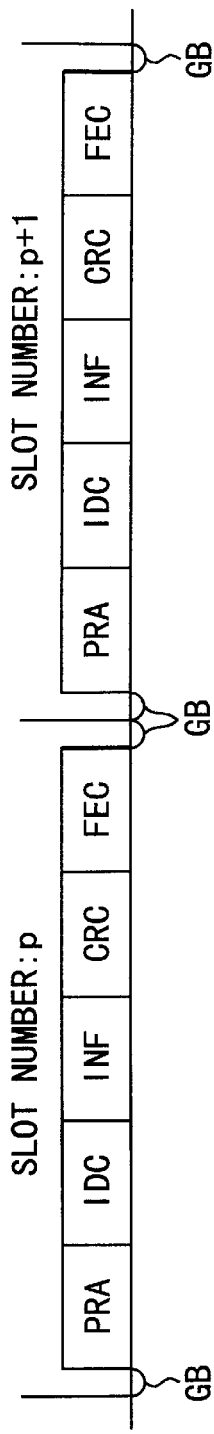
FIG. 42 is a diagram showing a modification of the format of an up stream.

The present invention is not limited to the above-mentioned embodiments. The format of the response signal, for example, is not limited to those referred to in the embodiments, but can be modified by adding an error correction code (FEC) as shown in FIG. 42, for example.

Figure 43:
FIG. 43 is a diagram showing an example of a method for discriminating a plurality of response units, if any, which have the same ID data.

The explanation of the foregoing embodiments assumes that all the ID data held in the response units 2 are different from each other. The invention is applicable, however, also to the case where a plurality of response units 2 hold the same ID data. In such a case, however, each group of the response units 2 having the same ID data is required to be discriminated, and for this purpose, random number information is added to the ID data, for example, as shown in FIG. 43. As an alternative, additional information can be used for discrimination.

The number of time slots and the method of assignment thereof in the entry sequence and the reentry sequence, i.e. the number and position of "1" in the address area designation information are not limited to those referred to in the above-mentioned embodiments but can be arbitrary. In the case where the number of the response units 2 read at a time is always small, for example, it may be more efficient to reduce the number of time slots in the first cycle. Consequently, the number of time slots and the method of assignment thereof in each cycle are desirably appropriately set in accordance with the situation in which the information ID system according to the invention is used.

According to the first embodiment, the verification sequence and the reentry sequence are executed. These sequences, however, are not essential but can be omitted. In such a case, the reading operation can be performed within a still shorter time. In the case requiring a very high reading accuracy, however, the verification sequence and the reentry sequence are recommended. It is therefore left up to the user more conveniently as to whether the verification sequence and the reentry sequence should be executed or not.

In the above-mentioned third embodiment, the common information and the individual information are set in the unit of one byte. As an alternative, they can be set in the unit of one bit or a plurality of bytes with equal effect.

Figure 44:
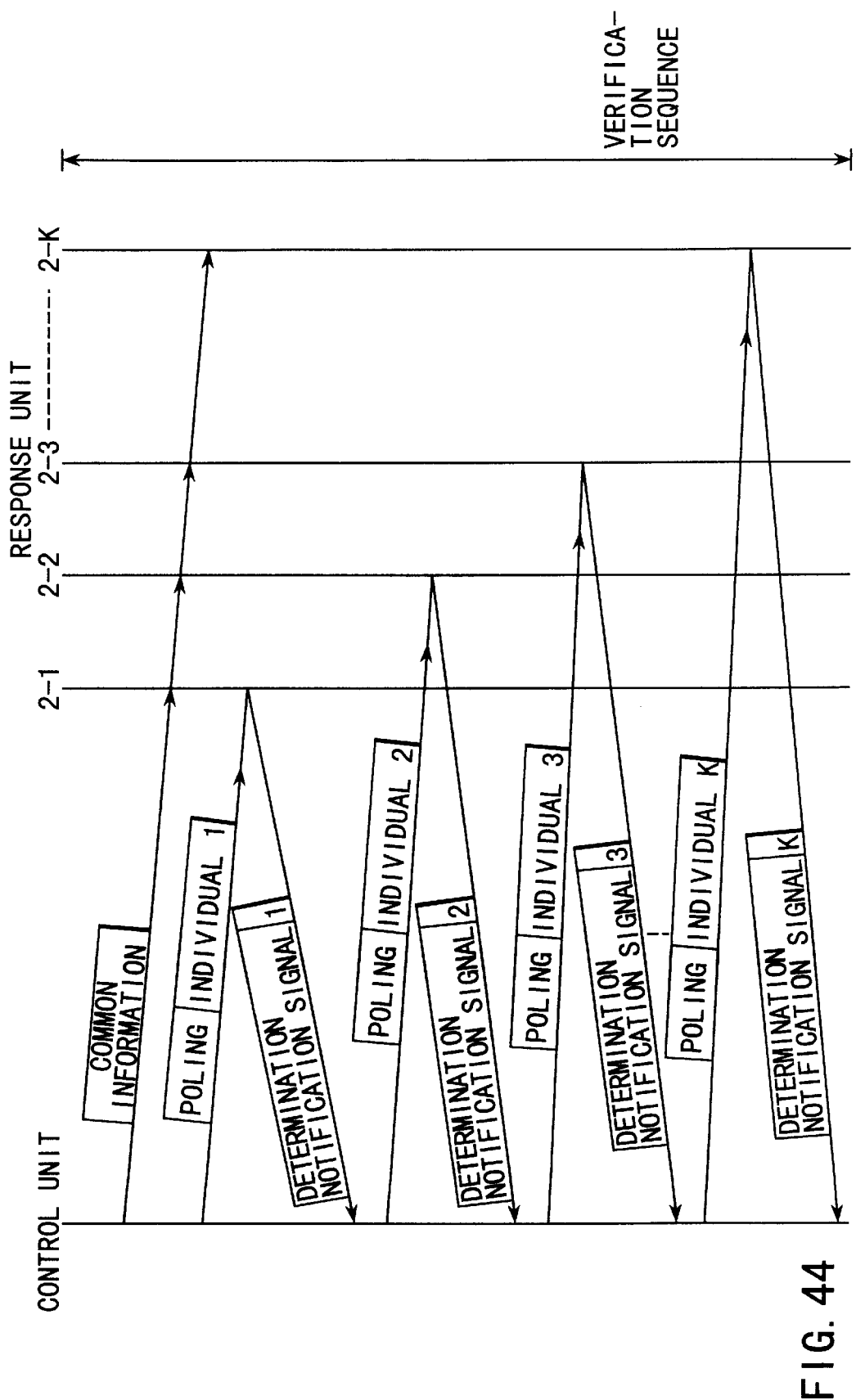
FIG. 44 is a sequence diagram showing the steps of the verification sequence in the case where the ID data is divided into common data and individual data and notified from the control unit 1 to the response units 2.

The technique of notifying the ID data divided into the common information and the individual information to the response units 2 from the control unit 1 as in the third embodiment, can be applied also using the steps of the first embodiment. Specifically, as shown in FIG. 44, the common information is broadcast to all the response units 23 in advance. After that, the polling indicating each individual information is effected sequentially.

According to the third embodiment, the transmission data size for notifying the ID data from the control unit 1 to the response units 2 is reduced by dividing the ID data into the common information and the individual information. Alternatively, the transmission data size can be reduced by transmitting only a part of the ID data. Assume, for example, that the ID data of four response units a to d are read and that the low-order eight bits of these ID data are in the state as shown in FIG. 45. In such a case, only the response unit a has the low-order three bits of "010", only the response unit b has the low-order three bits of "110", only the response unit c has the low-order five bits of "10111", and only the response unit d has the low-order five bits of "00111". Each of these ID data is compared in terms of the low-order bits and the portion of each ID data different from the corresponding portion of the remaining ID data is extracted, and the difference is transmitted in the form as shown in FIGS. 46A, 46B, 46C, 46D, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information identification system comprising a plurality of response units and a control unit, said plurality of response units each containing unique identification data being binary data of a plurality of bits, said control unit reading at least part of the identification data from said plurality of response units, said information identification system further comprising:

bit position designation means, arranged in said control unit, for producing predetermined bit position information and transmitting it to a predetermined downlink, said bit position information designating an arbitrary bit position in said identification data;

response information transmission means, arranged in each of said plurality of response units, for producing predetermined response information and transmitting it to a predetermined uplink in predetermined time slots, in response to an arrival of said bit position information transmitted by said bit position designation means, said response information pieces each containing at least part of the identification data and an error detection code of a corresponding one of said plurality of response units, said time slots used by respective response units to transmit said response information being determined in accordance with states of bit strings at the bit position in the identification data, which is indicated in said bit position information;

error inspection means, arranged in said control unit, for inspecting for presence or absence of an error in the response information pieces contained in each time slot and arriving through said uplink, based on said error detection codes in said response information pieces; and response information fetching means, arranged in said control unit, for fetching only response information pieces that have arrived in time slots determined to have no error by said error inspection means.

2. An information identification system according to claim 1, further comprising:

identification data judging means, arranged in said control unit, for judging the identification data of said plurality of response units that have transmitted said response information pieces, on the basis of the response information pieces fetched by said response information fetching means during a predetermined period of time;

determination requesting means, arranged in said control unit, for transmitting predetermined determination request data through said downlink to each of said plurality of response units having the identification data judged by said identification data judging means, in response to said error inspection means ceasing to detect a time slot having an error, said determination request data representing both of (i) common information indicating one bit string common to identification data pieces which are grouped together as having a same state at a same bit position and (ii) individual information indicating bit strings at remaining bit positions for each of the identification pieces, in cases where there are a plurality of identification data pieces being the same in state in the same bit position;

determination notification means, arranged in each of said plurality of response units, for producing predetermined determination notification information containing identification data of said plurality of response units and transmitting it to said uplink, in response to an arrival at said plurality of response units of said determination request data transmitted from said determination requesting means, said determination notification means, in cases where the arrived determination request data contains the grouped identification data, determining whether the arrived determination request data is self-addressed by (i) combining said individual information with said common information to judge the identification data and (ii) determining if the combined identification data is identical to that of the corresponding response unit;

response information determining means, arranged in said control unit, for receiving said determination notification information transmitted by said determination notification means and determining as effective only the response information pieces based on which said identification data judging means has judged the identification data contained in said determination notification information.

3. An information identification system according to claim 1, further comprising:

identification data judging means, arranged in said control unit, for judging the identification data of said plurality of response units that have transmitted said response information pieces, on the basis of the response information pieces fetched by said response information fetching means during a predetermined period of time;

determination requesting means, arranged in said control unit, for transmitting predetermined determination request data through said downlink to each of said plurality of response units having the identification data judged by said identification data judging means, in response to said error inspection means ceasing to detect a time slot having an error, said determination requesting means imparting only a bit string at said bit position to said determination request data if there is any identification data with a state of a bit position of a predetermined part thereof different from that of any of the remaining identification data;

determination notification means, arranged in each of said plurality of response units, for producing predetermined determination notification information and transmitting it to said uplink, in response to the arrival at said plurality of response units of said determination request data transmitted from said determination requesting means, said determination notification means determining whether said arriving determination request data is self-addressed by, in cases where said arriving determination request data only contains a bit string at a bit position, determining whether the identification data of the corresponding response unit has a same number of bit strings at a predetermined bit position coincident with the bit string; and response information determining means, arranged in said control unit, for receiving said determination notification information transmitted by said determination notification means and determining as effective only the response information based on which said identification data judging means has judged the identification data of said plurality of response units that have transmitted said determination notification information.

4. An information identification system according to claim 1, further comprising:

response information determining means, arranged in said control unit, for fetching only response information pieces that have arrived in a time slot determined to have no error by said error inspection means and determining said fetched response information pieces as effective response information;

identification data judging means, arranged in said control unit, for judging the identification data of said plurality of response units that have transmitted said response information pieces, on the basis of the response information pieces determined as effective by said response information determining means;

read result notification means, arranged in said control unit, for producing predetermined read result notification information and transmitting it to said downlink in response to said error inspection means ceasing to detect the time slot having an error, said read result notification information containing the identification data judged by said identification data judging means;

read result holding means, arranged in each of said response units, for judging whether the identification data contained in said read result notification information transmitted by said read result notification means contains the identification data identical to that held in the corresponding response unit, and holding the judgment result;

repetitive read designation means, arranged in said control unit, for producing predetermined repetitive read designation information and transmitting it to said downlink, said repetitive read designation information designating an arbitrary bit position in said identification data and designating a repetitive read mode, said repetitive read designation information being transmitted after transmission of said read result notification information by said read result notification means;

repetitive read response means, arranged in each of said response units, for causing said response information transmission means to transmit the response information pieces as long as (i) said repetitive read designation information transmitted by said repetitive read designation means arrives and (ii) a judgement result held in said read result holding means of the corresponding response unit does not indicate that the identification data held in the corresponding response unit is contained in said read result notification information; and repetitive read control means, arranged in said control unit, for causing said repetitive read designation means to repeat its processing operations until said response information ceases to be transmitted from any one of the response units as a result of transmission of said repetitive read designation information by said repetitive read designation means.

5. An information identification system according to claim 4, wherein when the identification data judged by said identification data judging means contains a plurality of identification data pieces which are the same in state at the same bit position, said read result notification means groups them together and imparts to said read result notification information one bit string which is in the same state at the same bit position and is common to the grouped identification data pieces as common information and bit strings at remaining bit positions for each of the identification pieces as individual information; and when the arriving read result notification information contains the grouped identification data pieces, said read result holding means judges said identification data pieces by combining said common information with said individual information and determines whether the combined identification data is identical to that of the corresponding response unit.

6. An information identification system according to claim 4, wherein said read result notification imparts to the read result notification information only the bit string at the bit position if there is an identification data piece which is different from the remaining identification data pieces in terms of the state of the bit position at its low-order part; and when the arriving read result notification information only contains a bit string at a bit position said, read result holding means judges whether the identification data contained in said read result notification information contains the identification data identical to that held in the corresponding response unit based on whether or not the bit string coincides with that having the same number of low-order bits in the identification data held in the corresponding response unit.

7. An information identification system according to claim 1, wherein said bit position information is a binary data of a plurality of bits, and said response information transmission means selects one time slot from a number of time slots in accordance with a state of a bit string at a bit position of the identification data of the corresponding response unit, the state of the bit position being the same as a predetermined state of the bit position in the bit position information, and the number of the time slots being determined based on a value of the bit in a predetermined state.

8. An information identification system according to claim 1, further comprising:

inspection result notification means, arranged in said control unit, for producing predetermined inspection result information and transmitting it to said downlink, said inspection result information indicating the inspecting result of said error inspection means.

9. An information identification system according to claim 8, further comprising:

repetitive requesting means, arranged in said control unit, for causing said bit position information designating means to transmit bit position information designating a bit position different from the previously-designated bit position, in response to the detection by said error inspection means of at least one time slot that has developed an error;

repetitive response means, arranged in each of said response units, for causing said response information transmission means to transmit the response information pieces to said uplink in a time slot, the time slot being selected based on the state of the bit string at the bit position indicated by said bit position information newly transmitted by said bit position designation means in the identification data held in the corresponding response unit.

10. An information identification system according to claim 9, wherein said repetitive response means select one time slot from a number of time slots on the basis of the state of the bit string at the bit position indicated by said bit position information, the number of the time slots being equivalent to a product of the number of bit positions indicated by said bit position information and the number of the time slots which have been determined to contain errors in said inspection result information notified by said inspection result notification means.

11. A control unit constituting an information identification system with a plurality of response units, each of which contains unique identification data being binary data of a plurality of bits, and reading at least part of identification data from said plurality of response units, said control unit comprising:

bit position designation means for producing predetermined bit position information and transmitting it to a predetermined downlink, said bit position information designating an arbitrary bit position in said identification data;

error inspection means for inspecting for presence or absence of an error in the response information pieces contained in each time slot and arriving through said uplink, based on said error detection codes in said response information pieces; and response information fetching means, arranged in said control unit, for fetching only response information pieces that have arrived in time slots determined to have no error by said error inspection means.

12. A control unit according to claim 11, further comprising:

response information determining means for fetching only response information pieces that have arrived in a time slot determined to have no error by said error inspection means and determining said fetched response information pieces as effective response information;

identification data judging means, arranged in said control unit, for judging the identification data of said plurality of response units that have transmitted said response information pieces, on the basis of the response information pieces determined as effective by said response information determining means;

read result notification means for producing predetermined read result notification information and transmitting it to said uplink in response to said error inspection means ceasing to detect the time slot having an error, said read result notification information containing the identification data judged by said identification data judging means;

repetitive read designation means for producing predetermined repetitive read designation information and transmitting it to said downlink, said repetitive read designation information designating an arbitrary bit position in said identification data and designating a repetitive read mode, said repetitive read designation information being transmitted after transmission of said read result notification information by said read result notification means; and repetitive read control means for causing said repetitive read designation means to repeat its processing operations until said response information ceases to be transmitted from any one of the response units as a result of the transmission of said repetitive read designation information by said repetitive read designation means.

13. A control unit according to claim 11, further comprising inspecting result notification means for producing predetermined inspection result information indicating the inspection result of said error inspection means and transmitting it to said downlink.

14. A control unit according to claim 11, further comprising repetitive response means for causing said bit position designating means to transmit bit position information designating a bit position different from the previously-designated bit position, in response to the detection by said error inspection means of at least one time slot that has developed an error.

15. A control unit according to claim 11, further comprising:

identification data judging means for judging the identification data of said plurality of response units that have transmitted said response information pieces, on the basis of the response information pieces fetched by said response information fetching means during a predetermined period of time;

determination requesting means for transmitting predetermined determination request data through said downlink to each of said plurality of response units having the identification data judged by said identification data judging means, in response to said error inspection means ceasing to detect a time slot having an error, said determination request data containing at least one of (i) common information indicating one bit string common to identification data pieces which are grouped together as having a same state at a same bit position and (ii) individual information indicating bit strings at remaining bit positions for each of the identification pieces; and response information determining means for receiving said determination notification information transmitted by said plurality of response units in response to the transmission of said determination requesting data by said determination requesting means and determining as effective only the response information pieces based on which the base on which said identification data judging means has judged the identification data contained in said determination notification information.

16. A control unit according to claim 11, further comprising:

identification data judging means for judging the identification data of said plurality of response units that have transmitted said response information pieces, on the basis of the response information pieces fetched by said response information fetching means during a predetermined period of time;

determination requesting means, arranged in said control unit, for transmitting predetermined determination request data through said downlink to each of said plurality of response units having the identification data judged by said identification data judging means, in response to said error inspection means ceasing to detect a time slot having an error, said determination requesting means imparting only a bit string at said bit position to said determination request data if there is any identification data with a state of a bit position of a predetermined part thereof different from that of any of the remaining identification data; and response information determining means for receiving said determination notification information transmitted by said plurality of response units in response to the transmission of said determination requesting data by said determination requesting mean and determining as effective only the response information pieces providing the base on which said identification data judging means has judged the identification data of said plurality of response units that have transmitted said determination notification information.

17. A control unit according to claim 11, wherein said repetitive requesting means causes said bit position designation means to designate a bit position different from the previously-designated bit position in order to set a plurality of new time slots in corresponding to the original time slot that has developed an error, and controlling said bit position designated by bit position designation means in such a manner as to reduce the number of the new time slots corresponding to the original time slot in the case where the total number of the new time slots exceeded a predetermined limit.

18. A control unit according to claim 11, wherein said repetitive requesting means causes said bit position designation means to designate a bit position different from the previously-designated bit position in order to set a plurality of new time slots in corresponding to the original time slot that has developed an error, and wherein in the case where the total number of the new time slots exceeds a predetermined limit, said original time slots are divided into a plurality of groups in such a manner that the total number of new time slots set for each of said original time slots included in each of said groups may not exceed said limit, and wherein the slot designation information for designating the original time slots included in each of said groups are sequentially transmitted to said downlink at different time points, while at the same time causing said bit position designation means to transmit the same bit position designation information at said different time points.

19. A response unit constituting an information identification system with a control unit for reading the required information and having unique identification data which is binary data of a plurality of bits, said response unit comprising:

a plurality of response information transmission means for producing predetermined response information pieces respectively and transmitting them to a predetermined uplink in predetermined time slots, in response to an arrival of said bit position information transmitted by said bit position designation means, said response information pieces each containing at least part of the identification data and an error detection code of a corresponding one of said plurality of response units, said time slots used by respective response units to transmit said response information being determined in accordance with states of bit strings at the bit position in the identification data, which is indicated in said bit position information.

20. A response unit according to claim 19, further comprising:

read result holding means for judging whether the identification data contained in said read result notification information transmitted by said control unit contains the identification data identical to that held in the corresponding response unit, and holding said judgement; and repetitive read response means for causing said response information transmission means to transmit the response information pieces as long as (i) said repetitive read designation information transmitted by said repetitive read designation means arrives and (ii) a judgement result held in said read result holding means of the corresponding response unit does not indicate that the identification data held in the corresponding response unit is contained in said read result notification information.

21. A response unit according to claim 19, wherein said bit position information is a binary data of a plurality of bits, and said response information transmission means selects one time slot from a number of time slots on a basis of a relationship between the arrangement of a predetermined state of bit position in the bit position information and the identification data of the corresponding response unit, the number of the time slots being determined based on a number of bits in a predetermined state.

22. A response unit according to claim 19, further comprising:

repetitive response means for causing said response information transmission means to transmit the response information pieces to said uplink in a time slot upon receipt from said control unit of inspection result information indicating judgement that an error exists in the time slot, the time slot being determined based on a state of a bit string at a bit position of the identification data held in the corresponding response unit, the bit position being indicated in bit position information newly transmitted from said bit position designation means.

23. A response unit according to claim 22, wherein said repetitive response means select one time slot from a number of time slots on the basis of the state of the bit string at the bit position indicated by said bit position information, the number of the time slots being equivalent to a product of the number of bit positions indicated by said bit position information and the number of the time slots which have been determined to contain errors in said inspection result information notified by said inspection result notification means.

24. A response unit according to claim 19, further comprising determination notification means for producing predetermined determination notification information containing identification data of said plurality of response units and transmitting it to said uplink, in response to an arrival at said plurality of response units of said determination request data transmitted from said control unit, said determination notification means, in cases where the arrived determination request data contains the grouped identification data, determining whether the arrived determination request data is self-addressed by (i) combining said individual information with said common information to judge the identification data and (ii) determining if the combined identification data is identical to that of the corresponding response unit.

25. A response unit according to claim 19, further comprising determination notification means for producing predetermined determination notification information and transmitting it to said uplink, in response to the arrival at said plurality of response units of said determination request data transmitted from said control unit, said determination notification means determining whether said arriving determination request data is self-addressed by, in cases where said arriving determination request data only contains a bit string at a bit position, determining whether the identification data of a corresponding response unit has a same number of bit strings at a predetermined bit position coincident with a bit.

26. A response unit according to claim 19, wherein said response information transmission means causes said response information to include only the bit string at the bit positions other than the bit positions thus far designated by said control unit in the identification data held in the corresponding response unit.

\* \* \* \* \*